(12) United States Patent
Imai et al.

(10) Patent No.: US 6,777,498 B2
(45) Date of Patent: Aug. 17, 2004

(54) OLEFIN THERMOPLASTIC ELASTOMER, PROCESS FOR PRODUCING THE SAME AND USE THEREOF

(75) Inventors: Tadashi Imai, Ichihara (JP); Akira Uchiyama, Ichihara (JP)

(73) Assignee: Mitsui Chemicals, Inc., Chiyoda-Ku (JP)

( * ) Notice: Subject to any disclaimer, the term of this patent is extended or adjusted under 35 U.S.C. 154(b) by 0 days.

(21) Appl. No.: 10/230,056

(22) Filed: Aug. 29, 2002

(65) Prior Publication Data

US 2003/0059637 A1 Mar. 27, 2003

(30) Foreign Application Priority Data

Aug. 31, 2001 (JP) ....................... 2001-264496

(51) Int. Cl.$^7$ .............. C08F 8/00; C08L 9/00; C08L 23/00; C08L 23/04; C08L 45/00
(52) U.S. Cl. ............ 525/191; 525/216; 525/232; 525/240
(58) Field of Search ................ 525/191, 216, 525/232, 240

(56) References Cited

U.S. PATENT DOCUMENTS

| | | |
|---|---|---|
| 5,292,811 A | 3/1994 | Murata et al. |
| 6,232,358 B1 * | 5/2001 | Haraguchi et al. .......... 521/148 |

FOREIGN PATENT DOCUMENTS

| | | |
|---|---|---|
| CA | 2171575 A1 | 9/1996 |
| EP | 0 360 475 A2 | 3/1990 |
| JP | 2-115249 A | 4/1990 |
| JP | 6-047816 A | 2/1994 |
| JP | 8-244068 A | 9/1996 |
| JP | 9-040814 A | 2/1997 |
| JP | 9-118133 A | 5/1997 |
| JP | 10-007849 A | 1/1998 |
| JP | 10-324200 A | 12/1998 |

* cited by examiner

*Primary Examiner*—Nathan M. Nutter
(74) *Attorney, Agent, or Firm*—Burns, Doane, Swecker & Mathis, L.L.P.

(57) ABSTRACT

The olefin thermoplastic elastomer of the invention has an islands-sea structure, in which the average particle diameter of the islands phases is not more than 2 $\mu$m, and has a gel fraction ranging from 0.5 to 15% by weight and a quantity of heat of melt at a temperature of 125° C. or below, as measured in a different scanning calorimeter (DSC), of 40% or more of the total quantity of heat of melt. The olefin thermoplastic elastomer can be obtained by melt blending in the presence of a crosslinking agent of a specific amount a blend that contains specific amounts of: a high density polyethylene having a density of 0.940 g/cm$^3$ or more, or a crystalline ethylene polymer having a crystallinity determined by a DSC method of 10% or more and a density of less than 0.940 g/cm$^3$, an ethylene/$\alpha$-olefin(/non-conjugated polyene) copolymer rubber comprising ethylene, an $\alpha$-olefin of 3 to 20 carbon atoms and optionally a non-conjugated polyene, and a polypropylene.

6 Claims, 1 Drawing Sheet

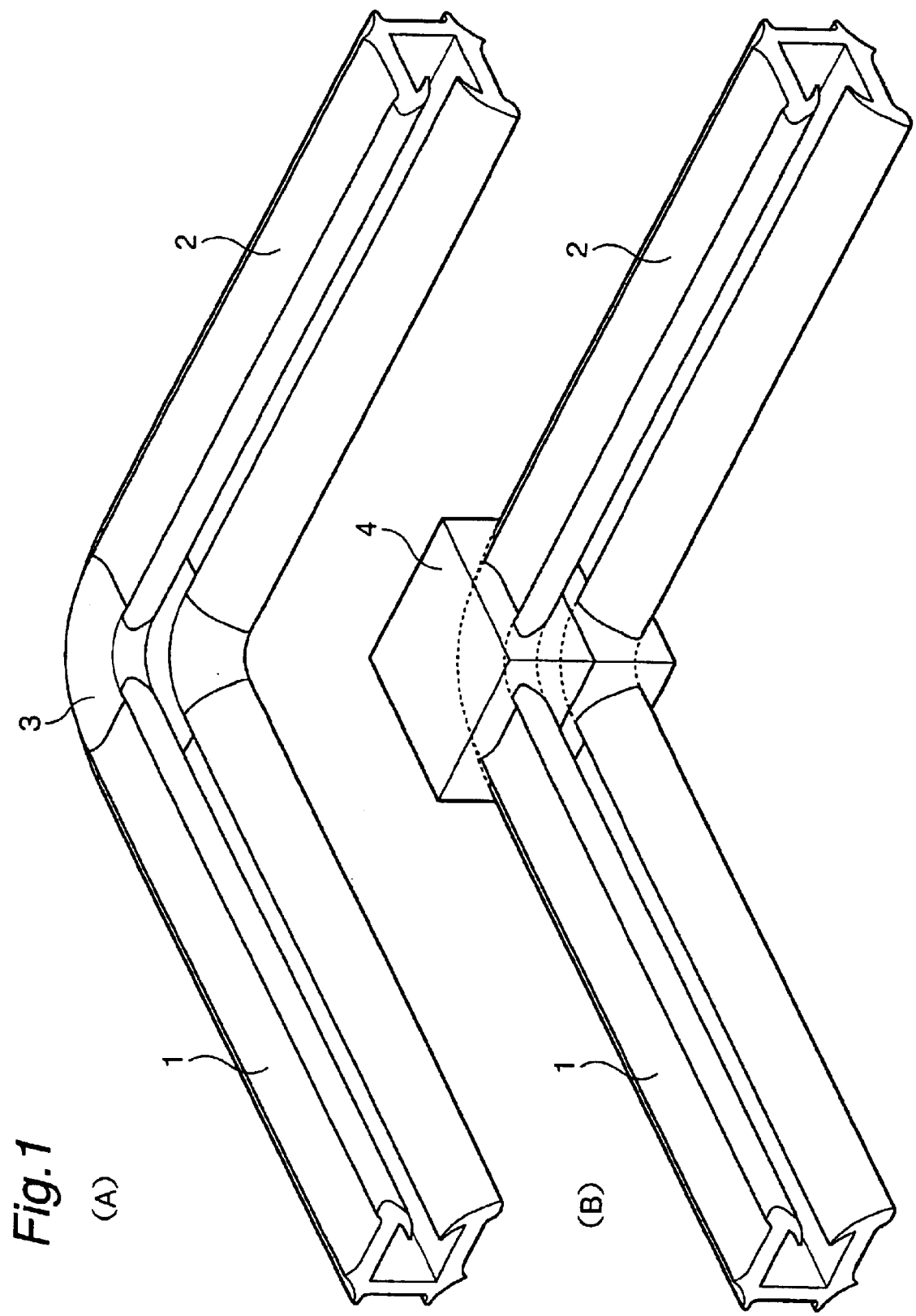
Fig.1 (A) (B)

OLEFIN THERMOPLASTIC ELASTOMER, PROCESS FOR PRODUCING THE SAME AND USE THEREOF

FIELD OF THE INVENTION

The present invention relates to an olefin thermoplastic elastomer, a process for producing the olefin thermoplastic elastomer and use of the olefin thermoplastic elastomer. More particularly, it relates to an olefin thermoplastic elastomer suitable for melt molding of irregular shaped corner connections or irregular shaped end parts such as a weather strip, door trim and the like for automobiles, a process for producing the same and use thereof.

BACKGROUND OF THE INVENTION

Conventional production of weather strips having a connection is generally carried out by cutting extrusion vulcanized molded articles of a rubber compound of an ethylene/propylene/non-conjugate diene terpolymer (EPDM), setting them in a mold from one side or both sides to form a cavity, injecting the same kind of a rubber molding material as this EPDM rubber compound into the cavity and performing vulcanizing molding.

Further, from the viewpoint of productivity, environmental adaptability and weight saving, a thermoplastic elastomer (composition) for which a vulcanization step is unnecessary has been used as materials of the molding in place of the vulcanized rubber prepared by using an ethylene/propylene/non-conjugate diene terpolymer (EPDM).

In general, vulcanization bonding or the like between a vulcanized rubber and a thermoplastic elastomer can be not conducted so that integration thereof has been conducted by means of an adhesive. However, it is not said that the integration with an adhesive is sufficient in view of productivity and environmental adaptability.

As the technique of a thermoplastic elastomer composition, addition of a polar group-containing resin can be described in JP-A-2(1990)-115249, JP-A-8(1996)-244068 and JP-A-10(1998)-324200. In the case of the addition of the polar group-containing resin, releasability of a molded article from a mold is lowered and thereby a molding cycle is prolonged.

As another technique, a technique that a specific ethylene/1-octene copolymer is added before molding a thermoplastic elastomer is disclosed in JP-A-9(1997)-40814. Although the present inventors confirmed that this technique is very effective against base material breaking, the rubber elasticity of molded articles is missing due to addition of a non-cross-linked ethylene polymer (ethylene/1-octene copolymer).

As a further technique of the vulcanized rubber, a technique of adding finely crystalline polyprolylene in addition to the conventional vulcanized rubber composition is disclosed in JP-A-10(1998)-7849. However, when finely crystalline polypropylene such as atactic polypropylene is added, not only rubber elasticity which the conventional vulcanized rubbers have is lowered but also tackiness of molded articles is induced occasionally with the elapse of time.

In addition to the techniques regarding the thermoplastic elastomers and the composition of vulcanized rubbers, there are a technique of obtaining anchoring effect by making a cut surface rough after cutting a vulcanized rubber (JP-A-9(1997)-118133) and a technique of applying a powdery polyolefin resin on the cut surface of a vulcanized rubber (JP-A-6(1994)-47816). Any of the above techniques, however, have a defect such that the adhesion is not improved for lowering in productivity.

Accordingly, it has been desired that an olefin thermoplastic elastomer having sufficient bonding strength to vulcanized rubbers without through an adhesive layer and capable of forming molded articles having such a characteristic that at peeling a base material is broken, that is, any of molded articles are broken but the molded articles are not broken at the interface thereof, and molded articles obtainable by melt bonding the elastomer with a vulcanized rubber be realized. Additionally, it has been desired that an olefin thermoplastic elastomer having sufficient hardness as a thermoplastic elastomer and capable of forming light weight molded articles with rubber elasticity, and having excellent moldability and economic properties, and molded articles obtainable by melt bonding the elastomer with a vulcanized rubber be realized.

OBJECT OF THE INVENTION

The present invention is intended to solve the problems associated with the prior art. It is an object of the invention to provide an olefin thermoplastic elastomer having sufficient bonding strength to vulcanized rubbers by no way of an adhesive layer and capable of forming molded articles having such a characteristic that at peeling a base material is broken, and to provide molded articles obtainable by melt bonding the elastomer with a vulcanized rubber. It is another object of the invention to provide an olefin thermoplastic elastomer having sufficient hardness as a thermoplastic elastomer and capable of forming light weight molded articles with rubber elasticity, and having excellent moldability and economic properties, and to provide molded articles obtainable by melt bonding the elastomer with a vulcanized rubber.

It is a further object of the invention to provide a process for preparing the above olefin thermoplastic elastomers.

SUMMARY OF THE INVENTION

The first olefin thermoplastic elastomer of the invention is an olefin thermoplastic elastomer, which forms an islands-sea structure, and has a particle phase having an average particle diameter of less than 2 $\mu$m, a gel fraction of from 0.5 to 15% by weight and a quantity of heat of melt at a temperature of 125° C. or below, as measured in a Differential scanning calorimeter (DSC), of 40% or more based on the total quantity of heat of melt.

The thermoplastic elastomer comprises an olefin resin and an olefin rubber and the olefin rubber is cross-linked.

The first olefin thermoplastic elastomer of the invention has a quantity of heat of melt, as measured in a differential scanning calorimeter (DSC), (which is the same as the above total quantity of heat of melt) of preferably 30 J/g or more.

With regard to the first olefin thermoplastic elastomer of the invention, the proportion of the islands phase having a ratio of major axis to minor axis of two or more is preferably not more than 3% based on the total of the islands phases, and the compression set (CS) at 70° C. is preferably not more than 65%. This compression set at 70° C. is an index of rubber elasticity.

The first olefin thermoplastic elastomer of the invention is obtainable by dynamically vulcanized an olefin resin and an olefin rubber in the presence of a cross-linking agent and preferably satisfies the following relation:

$A \times CS \leq 5.0$ wherein A is an amount (part by weight) of a cross-linking agent for adding based on the total amount (100 parts by weight) of the olefin resin and olefin rubber, and CS (%) is a compression set at 70° C., which is an index of rubber elasticity.

The second olefin thermoplastic elastomer of the invention is prepared from a blend comprising:

5 to 50 parts by weight of a high-density polyethylene (A1) having a density (ASTM D 1505) of 0.940 g/cm$^3$ or more, 5 to 70 parts by weight of an ethylene/α-olefin (/non-conjugated polyene) copolymer rubber (B) comprising ethylene, an α-olefin of 3 to 20 carbon atoms and optionally a non-conjugated polyene, and 5 to 50 parts by weight of a polypropylene (C), provided that the total of the components (A), (B) and (C) is 100 parts by weight, and has a gel fraction of from 0.5 to 15% by weight.

With regard to the second olefin thermoplastic elastomer of the invention, the high-densitypolyethylene (A1) preferably has a melt flow rate at 190° C. (MFR; ASTM D 1238 under a load of 2.16 Kg) of not more than 10 g/10 min.

The second olefin thermoplastic elastomer of the invention is an olefin thermoplastic elastomer having an islands-sea structure, and desirably has a particle phase having an average particle diameter of not more than 2 μm, a gel fraction of from 0.5 to 15% by weight, and a quantity of heat of melt at a temperature of 125° C. or below, as measured in a differential scanning calorimeter (DSC), of 40% or more based on the total quantity of heat of melt. The second olefin thermoplastic elastomer of the invention has a quantity of heat of melt, as measured in a differential scanning calorimeter (DSC) of preferably 30 J/g or more.

The process for producing the second olefin thermoplastic elastomer of the invention comprises melt blending, in the presence of a cross-linking agent (D), a blend comprising:

5 to 50 parts by weight of a high-density polyethylene (A1) having a density (ASTM D 1505) of 0.940 g/cm$^3$ or more, 5 to 70 parts by weight of an ethylene/α-olefin (/non-conjugated polyene) copolymer rubber (B) comprising ethylene, an α-olefin of 3 to 20 carbon atoms and optionally a non-conjugated polyene, and 5 to 50 parts by weight of a polypropylene (C), and thereby a thermoplastic elastomer having a gel fraction of from 0.5 to 15% by weight is obtained.

The cross-linking agent (D) is preferably an organic peroxide.

The third olefin thermoplastic elastomer of the invention is prepared from a blend comprising:

5 to 40 parts by weight of a crystalline ethylene polymer (A2) having a crystallinity as measured in DSC method of not less than 10% and a density (ASTM D 1505) of less than 0.940 g/cm$^3$, 5 to 70 parts by weight of an ethylene/α-olefin (/non-conjugated polyene) copolymer rubber (B) comprising ethylene, an α-olefin of 3 to 20 carbon atoms and optionally a non-conjugated polyene, and 5 to 40 parts by weight of a polypropylene (C), provided that the total of the components (A2), (B) and (C) is 100 parts by weight, and has a gel fraction of from 0.5 to 15% by weight.

The third olefin thermoplastic elastomer of the invention is an olefin thermoplastic elastomer having an islands-sea structure, and desirably has a particle phase having an average particle diameter of not more than 2 μm, a gel fraction of from 0.5 to 15% by weight, and a quantity of heat of melt at a temperature of 125° C. or below, as measured in a differential scanning calorimeter (DSC), of 40% or more based on the total quantity of heat of melt. The third olefin thermoplastic elastomer of the invention has a quantity of heat of melt, as measured in a differential scanning calorimeter (DSC) of preferably 30 J/g or more.

The process for producing the third olefin thermoplastic elastomer of the invention comprises melt blending, in the presence of a cross-linking agent (D), a blend comprising:

5 to 40 parts by weight of a crystalline ethylene polymer (A2) having a crystallinity as measured in DSC method, of not less than 10% and a density (ASTM D 1505) of less than 0.940 g/cm$^3$, 5 to 70 parts by weight of an ethylene/α-olefin (/non-conjugated polyene) copolymer rubber (B) comprising ethylene, an α-olefin of 3 to 20 carbon atoms and optionally a non-conjugated polyene, and 5 to 40 parts by weight of a polypropylene (C), provided that the total amount of the components (A2), (B) and (C) is 100 parts by weight, and thereby a thermoplastic elastomer having a gel fraction of from 0.5 to 15% by weight is obtained.

The cross-linking agent (D) is preferably an organic peroxide.

The first, second and third olefin thermoplastic elastomers according to the present invention are suitable for use in melt bonding to a vulcanized rubber molded article.

The first, second and third olefin thermoplastic elastomers are preferably a thermoplastic elastomer which causes base material breakage at tensile peeling in a melt bonding test of a vulcanized rubber press molded article with any of the first, second and third olefin thermoplastic elastomers.

The molded articles of the invention are obtainable by joining (bonding) a vulcanized rubber molded article to a molded article of any one of the first, second and third olefin thermoplastic elastomers.

The molded articles of the invention are preferably obtainable by melt bonding the vulcanized rubber molded article to any one of the first, second and third olefin thermoplastic elastomers.

The vulcanized rubber is preferably an ethylene/α-olefin/polyene copolymer rubber.

The molded articles of the present invention are suitably used for automobile interior and exterior materials. For example, they are suitably used for weather strip materials. Specifically, there is a molded article of a weather strip material prepared by joining (bonding) a linear part and a (joint) corner element (portion) wherein the linear part comprises the vulcanized rubber molded article and the corner element comprises any one of the first, second and third olefin thermoplastic elastomers.

The molded articles prepared by melt bonding the vulcanized rubber molded article with any one of the first, second and third olefin thermoplastic elastomers are obtainable by, for example, insert molding.

The molded articles of the invention are preferably molded articles, which result in base material breakage when the tensile peeling test on the joined parts of the molded articles is carried out.

Any one of the first, second and third olefin thermoplastic elastomers according to the invention has sufficient bonding strength to vulcanized rubbers by no way of an adhesive layer and can form molded articles which result in base material breakage at peeling and further, can form light weight molded articles having sufficient hardness and rubber elasticity as a thermoplastic elastomer.

BRIEF DESCRIPITON OF DRAWING

FIG. 1(A) is a schematic perspective view showing one embodiment of an automobile weather strip which corner part (portion) comprises a thermoplastic elastomer composition of the present invention.

FIG. 1(B) is a schematic perspective view showing a process for forming the corner part (portion) of the weather strip. In the FIG. 1 and signs 1 and 2 are each a cut extrusion molded article, sign 3 is a (joint) corner element (portion) and sign 4 is a mold for injection molding.

DETAILED DESCRIPITON OF THE INVENTION

The olefin thermoplastic elastomer, a process for production thereof and the use will be described below.

In the first, second or third olefin thermoplastic elastomer according to the invention, the term "olefin thermoplastic elastomer" indicates a thermoplastic elastomer comprising an olefin resin and an olefin rubber.

The olefin thermoplastic elastomer has physical properties similar to those of rubbers, for example, flexibility and impact resilience, and can be processed as a thermoplastic plastic in contrast to general rubbers. Such description is disclosed in, for example, Dictionary of Polymer published with Maruzen Co. in 1994.

Examples of the olefin resin are not particularly limited, and may include the polypropylene (C), the high density polyethylene (A1) and the crystalline ethylene polymer (A2), as described later in the paragraph of the second and third olefin thermoplastic elastomers.

Examples of the olefin rubber is not particularly limited, and may include an ethylene/α-olefin/polyene copolymer such as ethylene/α-olefin/non-conjugated polyene copolymer (B), and an ethylene/α-olefin copolymer, as described later in the paragraph of the second and third olefin thermoplastic elastomers.

First, the first olefin thermoplastic elastomer of the invention will be described.

First Olefin Thermoplastic Elastomer

The first olefin thermoplastic elastomer of the invention is a thermoplastic elastomer having an islands-sea structure wherein the islands (particle) phase has an average particle diameter of not more than 2 μm, the gel fraction is from 0.5 to 15% by weight, preferably 1 to 13% by weight and more preferably 2 to 11% by weight, the quantity of heat of melt at a temperature of 125° C. or below, as measured in a differential scanning calorimeter (DSC), of 40% or more, usually from 40 to 70%, preferably 42 to 68% and more preferably 43 to 67% based on the total quantity of heat of melt.

The term islands-sea structure refers to a phase structure in which particles are dispersed in a matrix.

Arbitrarily sampling from a photograph enlarged 10000 times with a transmission electron microscope and measuring the samples can determine the average particle diameter of the islands (particle) phase. Specifically, minor axes and major axes of all the islands (particle) phases in a transmission electron microscopic photograph are added and averaged, and a resulting average is taken as an average particle diameter of the particle phases.

The method of measuring the above gel fraction will be described in the paragraph of the second olefin thermoplastic elastomer according to the invention. Further, methods of measuring a quantity of heat of melt at 125° C. or lower and the total quantity of heat of melt will be described in the paragraph of Examples.

The first olefin thermoplastic elastomer of the present invention has a proportion of a particle phase having a ratio of major axis to minor axis of 2 or more of preferably 3% or less, more preferably from 0.1 to 3% and further preferably 0.2 to 2.0% based on the total number of particle phases and a compression set (CS) at 70° C., which is an index of rubber elasticity of the elastomer, of preferably 65% or less, more preferably 20 to 65% and further preferably 30 to 55%.

The first olefin thermoplastic elastomer of the present invention, further, has a quantity of heat of melt, as measured in a differential scanning calorimeter (DSC) of preferably 30 J/g or more, more preferably 30 to 80 J/g, further preferably 35 to 70 J/g and most preferably 40 to 60 J/g. The method of measuring a quantity of heat of melt (melt heat amount) will be described in the paragraph of Examples.

Furthermore, the first olefin thermoplastic elastomer of the invention comprises an olefin resin and an olefin rubber and preferably satisfies the following formula:

$$A \times CS < 5.0$$

wherein A is the amount (part by weight) of the cross-linking agent added based on 100 (parts by weight) of the olefin resin and the olefin rubber and CS (%) is a compression set at 70° C. which is an index of rubber elasticity.

The amount of the cross-linking agent A added is preferably from 0.01 to 0.12 part by weight, more preferably 0.03 to 0.10 part by weight based on 100 parts by weight of the total amount of the olefin resin and the olefin rubber.

The above parameter (A×CS<5.0) is a product of the amount A of the cross-linking agent (peroxide), which is added in blending the components of the composition, and a compression set (CS) which is an index of rubber elasticity. The parameter is satisfied only in the case that the amount A of the peroxide is small and the compression set (CS) is small.

The first olefin thermoplastic elastomer of the invention as described above can be prepared by, for example, the following processes:

(1) a process for producing the olefin thermoplastic elastomer which process comprises melt blending, in the presence of the cross-linking agent (D), a blend comprising:

5 to 50 parts by weight of a high-density polyethylene having a density (ASTM D 1505) of 0.940 g/cm³ or more (A1), 5 to 70 parts by weight of an ethylene/α-olefin (/non-conjugated polyene) copolymer rubber (B) comprising ethylene, an α-olefin of 3 to 20 carbon atoms and optionally a non-conjugated polyene, and 5 to 50 parts by weight of a polypropylene (C) provided that the total amount of the components (A1), (B) and (C) is 100 parts by weight, to obtain a thermoplastic elastomer having a gel fraction of 0.5 to 15% by weight, or (2) a process for producing the olefin thermoplastic elastomer which process comprises melt blending, in the presence of the cross-linking agent (D), a blend comprising:

5 to 40 parts by weight of a crystalline ethylene polymer (A2) having a crystallinity, as measured in DSC, of 10% or more and a density (ASTM D 1505) of less than 0.940 g/cm³, 5 to 70 parts by weight of an ethylene/α-olefin (/non-conjugated polyene) copolymer rubber (B) comprising ethylene, an α-olefin of 3 to 20 carbon atoms and optionally a non-conjugated polyene, and 5 to 40 parts by weight of a polypropylene (C) provided that the total amount of the components (A2), (B) and (C) is 100 parts by weight, to obtain a thermoplastic elastomer having a gel fraction of 0.5 to 15% by weight.

Namely, the process for producing the second or third olefin thermoplastic elastomer according to the invention can prepare the first olefin thermoplastic elastomer composition of the present invention.

Next, the second olefin thermoplastic elastomer and the process for producing the same will be described.

Second Olefin Thermoplastic Elastomer

The second olefin thermoplastic elastomer of the invention is obtainable by melt blending, in the presence of a cross-linking agent (D), a blend comprising a high-density polyethylene (A1), an ethylene/α-olefin (/non-conjugated polyene) copolymer rubber (B) and a polypropylene (C). This elastomer is a partially cross-linked thermoplastic elastomer composition wherein it is considered that the high-density polyethylene (A1) and the copolymer rubber (B) are partially cross-linked.

High-Density Polyethylene (A1)

The high-density polyethylene (A1) employed for the invention is an olefin resin and has a density (ASTM D 1505) of 0.940 g/cm$^3$ or more, usually from 0.940 to 0.970 g/cm$^3$, preferably 0.945 to 0.965 g/cm$^3$ and further more preferably 0.950 to 0.960 g/cm$^3$.

The high-density polyethylene (A1) is an ethylene homopolymer (polyethylene) or a crystalline ethylene/α-olefin copolymer comprising ethylene and an α-olefin having 3 to 20 carbon atoms, preferably 3 to 8 carbon atoms. When it contains a comonomer, the comonomer content is small, for example, not more than 10 mol % based on the whole amount.

The high-density polyethylene (A1) has a melt flow rate (MFR; ASTM D 1238, 190° C., under a load of 2.16 Kg) of preferably not more than 10 g/10 min, usually 0.01 to 10 g/10 min and more preferably 0.1 to 7 g/10 min. Using the high-density polyethylene (A1) having an MFR of the above range, a thermoplastic elastomer composition having excellent moldability is prepared.

The high-density polyethylene (A1) has a melting point (Tm), as measured in a differential scanning calorimeter (DSC) of usually not more than 140° C.

The high-density polyethylene (A1) is used in an amount of 5 to 50 parts by weight, preferably 10 to 40 parts by weight and more preferably 15 to 35 parts by weight based on the total amount (100 parts by weight) of the high-density polyethylene (A1), the ethylene/α-olefin (/non-conjugated polyene) copolymer rubber (B) and the polypropylene (C). Using the high-density polyethylene (A1) in the above proportion, a thermoplastic elastomer composition having excellent elasticity and bonding properties with extrusion molded articles, for example, a thermoplastic elastomer weather strip, a vulcanized rubber weather strip, etc used for automobiles can be prepared at low cost.

Ethylene/α-olefin(/Non-Conjugated Polyene) Copolymer Rubber (B)

The ethylene/α-olefin(/non-conjugated polyene) copolymer rubber (B) employed for the invention is a copolymer rubber of ethylene, an α-olefin and optionally a non-conjugated polyene, for example, an ethylene/α-olefin/non-conjugated polyene copolymer rubber (B-1) or ethylene/α-olefin copolymer rubber (B-2).

The ethylene/α-olefin/non-conjugated polyene copolymer rubber (B-1) employed for the invention is an olefin rubber of ethylene, an α-olefin having 3 to 20 carbon atoms and a non-conjugated polyene.

As the ethylene/α-olefin/non-conjugated polyene copolymer rubber (B-1) employed in the invention, a copolymer having a crystallinity, as measured in DSC, of less than 10% is desired.

Examples of the α-olefin of 3 to 20 carbon atoms include propylene, 1-butene, 4-methylpentene-1,1-hexene, 1-heptene, 1-octene, 1-nonene, 1-decene, 1-undecene, 1-dodecene, 1-tridecene, 1-tetra-decene, 1-pentadecene, 1-hexadecene, 1-heptadecene, 1-nonadecene, 1-eicocene, 9-methyldecene-1, 11-methyldodecene-1,12-ethyltetradecene-1 etc. Among them, propylene, 1-butene, 4-methylpentene-1,1-hexene and 1-octene are preferred. Particularly, propylene is preferred.

These α-olefins may be used either singly or in combination with two or more.

Examples of the non-conjugated polyene may include:

chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene;

cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes, such as 2,3-diisopropylidene-5-norbornene, 2-ethylidene-3-isopropylidene-5-norbornene, 2-propenyl-2,2-norbornadiene and 4-ethylidene-8-methyl-1,7-nanodiene. Of these, preferable are 5-ethylidene-2-norbornene, 5-vinyl-2-norbornene, cyclopentadiene and 4-ethylidene-8-methyl-1,7-nanodiene.

The ethylene/α-olefin/non-conjugated polyene copolymer rubber (B-1) employed in the invention has a content of structural units derived from ethylene (ethylene content) of 50% by mol or more, usually from 50 to 90% by mol, preferably from 60 to 85% by mol, a content of structural units derived from an α-olefin of 3 to 20 carbon atoms (α-olefin content) of 50% by mol or less, usually from 50 to 10% by mol, preferably 40 to 15% by mol, and a non-conjugated polyene content in terms of iodine value of usually from 0.1 to 30, preferably 0.1 to 25. The total of the ethylene content and the α-olefin content is 100% by mol. The composition of the ethylene/α-olefin/non-conjugated polyene copolymer rubber (B-1) is determined by $^{13}$C-NMR measurement.

The ethylene/α-olefin/non-conjugated polyene copolymer rubber (B-1) employed in the invention may be an oil extended rubber which is prepared by blending with a softener, preferably a mineral oil softener in the preparation thereof. As the mineral oil softener, conventional mineral oil softeners such as paraffin process oils, etc are exemplified.

The ethylene/α-olefin/non-conjugated polyene copolymer rubber (B-1) has a Mooney viscosity [ML$_{1+4}$ (100° C.)] of usually from 10 to 250, preferably 30 to 150.

The ethylene/α-olefin/non-conjugated polyene copolymer rubber (B-1) as described above can be prepared by conventionally known methods.

The ethylene/α-olefin/non-conjugated polyene copolymer rubber (B-1) is used in an amount of from 5 to 70 parts by weight, preferably 10 to 65 parts by weight and more preferably 20 to 60 parts by weight based on total amount (100 parts by weight) of the high-density polyethylene (A1), the ethylene/α-olefin/non-conjugated polyene copolymer rubber (B-1) and the polypropylene (C). Using the copolymer rubber (B-1) in the above proportion, a thermoplastic elastomer composition having excellent bonding properties with extrusion molded articles, for example, a thermoplastic elastomer weather strip, a vulcanized rubber weather strip, etc used for automobiles, capable of forming corner parts with proper softness (hardness) and also having excellent moldability can be obtained.

As the copolymer rubber (B) of ethylene, an α-olefin and optionally a non-conjugated polyene, an ethylene/α-olefin copolymer rubber (B-2) prepared by copolymerizing ethylene and an α-olefin having 3 to 20 carbon atoms, preferably 3 to 12 carbon atoms, and more preferably 3 to 8 carbon atoms can be also used.

Examples of the ethylene/α-olefin copolymer rubber (B-2) may include an ethylene/propylene copolymer rubber (EPR), an ethylene/1-butene copolymer rubber (EBR) and an ethylene/1-octene copolymer rubber (EOR).

The ethylene/α-olefin copolymer rubber (B-2) desirably has a melt flow rate (MFR; ASTM D 1238, 190° C., under a load of 2.16 Kg) of usually from 0.1 to 100 g/10 min, preferably 0.2 to 50 g/10 min and more preferably 0.5 to 30 g/10 min. The ethylene/α-olefin copolymer rubber (B-2) has a crystallinity, as measured in DSC, of preferably less than 10%.

The α-olefin constituting the ethylene/α-olefin copolymer rubber (B-2) is the same as that constituting the ethylene/α-olefin(/non-conjugated polyene) copolymer rubber (B). The copolymer rubber (B-2) has a content of structural units derived from ethylene (ethylene content) of 50% by mol or more, usually from 50 to 90% by mol and preferably 60 to 85% by mol, and a content of structural units derived from α-olefin of 3 to 20 carbon atoms (α-olefin content) of 50% by mol or less, usually from 50 to 10% by mol and preferably 40 to 15% by mol.

The copolymer rubber (B) of ethylene, an α-olefin and optionally a non-conjugated polyene may comprise at least one of the ethylene/α-olefin(/non-conjugated polyene) copolymer rubbers (B-1) or may comprise at least one of the ethylene/α-olefin copolymer rubbers (B-2) or may comprise the rubbers (B-1) and (B-2) in combination. In the combined use of the rubbers (B-1) and (B-2), the proportion of the rubbers (B-1) and (B-2) is not particularly limited, for example, the ethylene/α-olefin copolymer rubbers (B-2) is used in an amount of 50 parts by weight or less, usually from 10 to 50 parts by weight based on the total amount (100 parts by weight) of the ethylene/α-olefin (/non-conjugated polyene) copolymer rubbers (B-1) and the ethylene/α-olefin copolymer rubbers (B-2). Additionally, the total amount of the ethylene/α-olefin(/non-conjugated polyene) copolymer rubbers (B-1) and the ethylene/α-olefin copolymer rubbers (B-2) are from 5 to 70 parts by weight, preferably 10 to 65 parts by weight and more preferably 20 to 60 parts by weight based on the total amount (100 parts by weight) of the high-density polyethylene (A1), the ethylene/α-olefin/non-conjugated polyene copolymer rubber (B-1), the polypropylene (C)and the ethylene/α-olefin copolymer rubber (B-2).

Using the copolymer rubbers (B-1) and (B-2) in the above proportion, a thermoplastic elastomer composition having excellent bonding properties with extrusion molded articles, for example, a thermoplastic elastomer weather strip, a vulcanized rubber weather strip, etc, capable of forming corner parts with proper softness (hardness) and also having excellent moldability can be obtained.

Polypropylene (C))

The polypropylene (C) employed in the invention is an olefin resin, which is a propylene homopolymer or a propylene copolymer prepared by random copolymerizing or block copolymerizing propylene, ethylene and/or a α-olefin having 4 to 20 carbon atoms.

Examples of the α-olefin having 4 to 20 carbon atoms may include 1-butene, 4-methylpentene-1,1-hexene, 1-heptene, 1-octene, 1-nonene, 1-decene, 1-undecene, 1-dodecene, 1-tridecene, 1-tetra-decene, 1-pentadecene, 1-hexadecene, 1-heptadecene, 1-nonadecene, 1-eicocene, 9-methyldecene-1, 11-methyldodecene-1 and 12-ethyltetradecene-1.

The co-monomer used for copolymerization with propylene is preferably ethylene or 1-butene. These α-olefins may be used singly or in combination with two or more.

The propylene copolymer has a content of structural units derived from propylene (propylene content) of usually from 50 to 90% by weight, and a content of structural units derived from the co-monomer (co-monomer content) of usually from 50 to 10% by weight. The composition of the polyene copolymer is determined by $^{13}$C-NMR measurement.

The polypropylene (C) desirably has a melt flow rate (MFR; ASTM D 1238, 230° C., under a load of 2.16 Kg) of usually from 0.01 to 100 g/10 min, preferably 0.1 to 80 g/10 min and more preferably 0.3 to 60 g/10 min.

The polypropylene (C) has a melting point (Tm), as measured in DSC, of usually 170° C. or below.

The polypropylene (C) is used in an amount of 5 to 50 parts by weight, preferably 10 to 45 parts by weight and more preferably 15 to 40 parts by weight based on the total amount (100 parts by weight) of the high-density polyethylene (A1), the ethylene/α-olefin (/non-conjugated polyene) copolymer rubber (B) and the polypropylene (C). Using the polypropylene (C) in the above proportion, a thermoplastic elastomer composition having excellent bonding properties with extrusion molded articles, for example, a thermoplastic elastomer weather strip, a vulcanized rubber weather strip, etc, capable of forming corner parts with proper softness (hardness) and also having excellent moldability can be obtained.

Cross-Linking Agent (D)

Examples of the cross-linking agent (D) employed in the invention may include an organic peroxide, sulfur, a sulfur compound and phenolic vulcanzing agents such as a phenolic resin Among them, the organic peroxide is preferably used.

Examples of the organic peroxide may include dicumylperoxide, di-tert-butylperoxide, 2,5-dimethyl-2,5-di-(tert-butylperoxy) hexane, 2,5-dimethyl-2,5-di(tert-butylperoxy)hexyne-3,1,3-bis(tert-butylperoxyisopropyl) benzene, 1,1-bis(tert-butylperoxy)-3,3,5-trimethylcyclohexane, n-butyl-4,4-bis (tert-butylperoxy) valerate, benzoylperoxide, p-chlorobenzoyl peroxide, 2,4-dichiorobenzoyl peroxide, tert-butylperoxy bezoate, tert-butylperbezoate, tert-butylperoxy isopropyl carbonate, diacetylperoxide, lauroyl peroxide and tert-butylcumyl peroxide.

Among them, 2,5-dimethyl-2,5-di-(tert-butylperoxy) hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis (tert-butylperoxy) valerate are preferred from the standpoints of odor properties and scorching stability. Further, 1,3-bis(tert-butylperoxyisopropyl) benzene is most preferred.

The organic peroxide is used in an amount of from 0.01 to 0.12 part by weight, preferably about 0.03 to 0.10 part by weight based on the total amount (100 parts by weight) of the high-density polyethylene (A1), the ethylene/α-olefin (/non-conjugated polyene) copolymer rubber (B) and the polypropylene (C). Using the organic peroxide in the above proportion, a thermoplastic elastomer composition having the cross-linked copolymer rubber (B) is obtained and also molded articles having sufficient rubber characteristics such as heat resistance, tensile properties, elastic recovery and impact resilience, and sufficient strength are obtained. Further, the composition has excellent moldability.

In the cross-linking with the organic peroxide according to the invention, a cross-linking assistant such as sulfur, p-quinone dioxime, p,p'-dibenzoyl quinone dioxime, N-methyl-N,4-dinitrosoaniline, nitrobenzene, diphenyl guanidine and trimethyolpropane-N,N'-m-phenylene dimaleimide, a polyfunctional methacrylate monomer such as divinyl benzene, triallylcyanurate, ethylene glycol dimethacrylate, diethylene glycol dimethacrylate, polyethylene glycol dimethacrylate, trimethyolpropane trimethacrylate and allyl methacrylate, and a polyfunctional vinyl monomer such as vinyl butyrate and vinyl stearate can be mixed. The use of these compounds can induce a uniform and moderate cross-linking reaction. Particularly, it is most suitable in the invention to use divinyl benzene because divinyl benzene has easy handling properties, good compatibility with the high-density polyethylene (A1), the copolymer rubber (B) and the polypropylene (C), which are main components of the above compositions for treatment, and has a function of dissolving organic peroxides, and acts as a dispersing assistant for organic peroxides so that the cross-linking effect with heat treatment is uniform and the composition having a good balance between fluidity and physical properties.

In the present invention, the cross-linking assistant or the polyfunctional vinyl monomer is used in an amount of usually from 0.01 to 0.4% by weight, preferably about 0.03 to 0.2% by weight based on the total amount (100% by weight) of the high-density polyethylene (A1), the ethylene/α-olefin (/non-conjugated polyene) copolymer rubber (B) and the polypropylene (C). Using the cross-linking assistant or the polyfunctional vinyl monomer in the above proportion, a composition having excellent fluidity which does not induce a change in physical properties caused by heat history during the processing and molding of the composition is obtained.

(Other Components)

The second olefin thermoplastic elastomer of the invention may be optionally blended with additives such as a slip agent, a filler, a antioxidant, a weathering stabilizer, a colorant as long as the object of the invention is not missed.

Examples of the slip agent may include fatty amide, silicon oil, glycerin, wax and paraffin oil.

Examples of the filler may include conventionally known fillers, specifically, carbon black, clay, talc, calcium carbonate, kaolin, diatomaceous earth, silica, aluminum oxide, graphite and glass fiber.

Second Olefin Thermoplastic Elastomer

The second olefin thermoplastic elastomer of the invention can be prepared by mixing the high-density polyethylene (A1), the ethylene/α-olefin (/non-conjugated polyene) copolymer rubber (B) and the polypropylene (C) in the above-described specific proportion, and dynamically heat-treating them in the presence of the cross-linking agent (D). In this mixing, the above additive, for example, the slip agent and the antioxidant may be mixed to them.

The expression "dynamically heat treating" means kneading in a molten state (the same shall apply hereinafter) The dynamic heat treatment of the invention is preferably carried out in a non-opened apparatus in an atmosphere of an inert gas such as nitrogen or carbonic acid gas.

The kneading temperature is usually from 150 to 280° C., preferably 170 to 240° C. The kneading time is usually from 1 to 20 min, preferably 3 to 10 min. The shear force for application is from 10 to 100,000 $sec^{-1}$, preferably 100 to 50,000 $sec^{-1}$ in terms of shear rate.

As a kneading apparatus, a mixing roll, intensive mixer (for example, Banbury mixer or kneader), uni-axial or biaxial extruders can be used, and particularly a non-open apparatus is preferable.

According to the present invention, a thermoplastic elastomer composition wherein the copolymer rubber (B) is cross-linked can be obtained by the above dynamic heat treatment. It is considered that the high-density polyethylene (A1) and the copolymer rubber (B) are cross-linked in the thermoplastic elastomer. In the invention, the gel fraction, as measured in the following method, is not more than 15% by weight, usually from 0.5 to 15% by weight, preferably 1 to 13% by weight and more preferably 2 to 11% by weight.

Method for Measuring Gel Fraction

As a specimen, about 100 mg of pellets of a thermoplastic elastomer composition is weighed, and then packed in a screen having 325 meshes and immersed in 30 ml, which amount is sufficient for the pellets, of p-xylene at 140° C. for 24 hr in a sealed vessel.

In next place, this specimen is taken out on a filter paper and dried at 80° C. for 2 hr or more until the amount is constant. The gel fraction is represented by the following formula.

Gel fraction [% by weight]=[the weight of the dried specimen after immersing in p-xylene/the weight of the specimen before immersing in p-xylene]×100

The second olefin thermoplastic elastomer thus prepared according to the invention has a melt flow rate (MFR; ASTM D 1238, 230° C., under a load of 2.16 Kg) of usually from 0.01 to 1000 g/10 min, preferably 0.05 to 500 g/10 min and more preferably 0.1 to 100 g/10 min. The thermoplastic elastomer having an MFR of the above range has excellent moldability.

The second olefin thermoplastic elastomer of the invention forms an islands-sea structure which structure comprises the phases of the high-density polyethylene (A1) and the ethylene/α-olefin (/non-conjugated polyene) copolymer rubber (B) asaparticle phase and the phase of the polypropylene (C) as a sea (matrix) phase.

The second olefin thermoplastic elastomer thus prepared according to the invention is preferably the first olefin thermoplastic elastomer of the invention.

That is, the second olefin thermoplastic elastomer desirably has the islands (particle) phase of an average particle diameter of not more than 2 μm in the islands-sea structure, a gel fraction of from 0.5 to 15% by weight, and a quantity of heat of melt at 125° C. or below, as measured in a differential scanning calorimeter (DSC) of not less than 40% based on the all quantity of heat of melt.

With regard to the second olefin thermoplastic elastomer of the invention, the proportion of a particle phase having a ratio of major axis to minor axis of two or more is preferably not more than 3%, more preferably from 0.1 to 3% based on the total of the particle phases, and the compression set (CS) at 70° C., which is an index of rubber elasticity, is preferably not more than 65%, more preferably 20 to 65%.

The second olefin thermoplastic elastomer desirably has a quantity of heat of melt, as measured in a differential scanning calorimeter (DSC), of preferably 30 J/g or more, usually from 30 to 80 J/g.

The second olefin thermoplastic elastomer preferably satisfies the following relation:

$$A \times CS < 5.0$$

wherein A is an amount (part by weight) of the cross-linking agent for adding based on the total amount (100 parts by weight) of the olefin resin and the olefin rubber, and CS(%) is a compression set at 70° C., which is an index of rubber elasticity.

The second olefin thermoplastic elastomer of the invention forms an islands-sea structure which structure comprises the phases of the high-density polyethylene (A1) and the ethylene/α-olefin (/non-conjugated polyene) copolymer rubber (B) as a particle phase and the phase of the polypropylene (C) as a sea (matrix) phase.

Next, the third olefin thermoplastic elastomer of the invention and the process for production thereof will be described.

Third Olefin Thermoplastic Elastomer

The third olefin thermoplastic elastomer of the invention is obtainable by melt blending, in the presence of a cross-linking agent (D), a blend comprising a specific crystalline ethylene polymer (A2), an ethylene/α-olefin (/non-conjugated polyene) copolymer rubber (B) and a polypropylene (C). This elastomer is a partially cross-linked thermoplastic elastomer composition wherein it is considered that the crystalline ethylene polymer (A2) and the copolymer rubber (B) are partially cross-linked.

Crystalline Ethylene Polymer (A2)

The crystalline ethylene polymer (A2) employed in the invention has a crystallinity, as measured in DSC, of 10% or more. The method of measuring the crystallinity will be described in Examples.

The crystalline ethylene polymer (A2) desirably has a density (ASTM D 1505) of 0.870 g/cm³ or more and less than 0.940 g/cm³, usually 0.880 g/cm³ or more and less than 0.940 g/cm³, preferably 0.885 g/cm³ or more and less than 0.940 g/cm³ and further more preferably 0.890 g/cm³ or more and less than 0.940 g/cm³.

The crystalline ethylene polymer (A2) is an ethylene homopolymer (polyethylene) or a crystalline ethylene/α-olefin copolymer comprising ethylene and an α-olefin having 3 to 20 carbon atoms, preferably 3 to 8 carbon atoms. When it contains a comonomer, the content of structural units derived from the comonomer is small, for example, not more than 25 mol % based on the whole amount.

The crystalline ethylene polymer (A2) employed in the invention has a crystallinity, as measured in a differential scanning calorimeter (DSC), of not less than 10%. Examples of the crystalline ethylene polymer (A2) may include low-density polyethylene, linear low-density polyethylene, ethylene/1-butene copolymer, ethylene/propylene copolymer and ethylene/octane copolymer. Among them, low-density polyethylene, linear low-density polyethylene and a blend of low-density polyethylene and linear low-density polyethylene are preferred. Particularly, linear low-density polyethylene is preferred. Further, two or more kinds of low-density polyethylenes may be used or two or more kinds of linear low-density polyethylenes may be used.

The catalyst used in preparation of the crystalline ethylene polymer (A2), which is not particularly limited, is produced by a general Ziegler-Natta catalyst or a metallocene catalyst.

The crystalline ethylene polymer (A2) has a melt flow rate (MFR; ASTM D 1238, 190° C., under a load of 2.16 Kg) of usually 0.01 to 500 g/10 min, preferably 0.1 to 100 g/10 min and more preferably 0.5 to 50 g/10 min. Using the crystalline ethylene polymer (A2) having an MFR of the above range, a thermoplastic elastomer composition having excellent moldability is prepared.

The crystalline ethylene polymer (A2) is used in an amount of from 5 to 40 parts by weight, preferably 10 to 35 parts by weight and more preferably 15 to 30 parts by weight based on the total amount (100 parts by weight) of the crystalline ethylene polymer (A2), the ethylene/α-olefin (/non-conjugated polyene) copolymer rubber (B) and the polypropylene (C). Using the crystalline ethylene polymer (A2) in the above proportion, a thermoplastic elastomer composition having excellent rubber elasticity and excellent flexibility, and when subjected to heat treatment, having improved rubber elasticity can be obtained at low cost. Simultaneously, a thermoplastic elastomer composition having excellent bonding properties with extrusion molded articles, for example, a vulcanized rubber weather strip used for automobiles can be prepared at low cost.

(Ethylene/α-olefin(/Non-Conjugated Polyene) Copolymer Rubber (B))

The ethylene/α-olefin(/non-conjugated polyene) copolymer rubber (B) employed in the invention is a copolymer rubber of ethylene, an α-olefin and optionally a non-conjugated polyene, for example, an ethylene/α-olefin/non-conjugated polyene copolymer rubber (B-1) or an ethylene/α-olefin copolymer rubber (B-2). The ethylene/α-olefin(/non-conjugated polyene) copolymer rubber (B) is the same as that used in the preparation of the second olefin thermoplastic elastomer according to the invention.

As the ethylene/α-olefin/non-conjugated polyene copolymer rubber (B-1) employed in the invention, a copolymer having a crystallinity, as measured in DSC, of less than 10% is desired.

The ethylene/α-olefin(/non-conjugated polyene) copolymer rubber (B) may comprise at least one kind of the ethylene/α-olefin/non-conjugated polyene copolymer rubbers (B-1) or may comprise at least one kind of the ethylene/α-olefin copolymer rubbers (B-2) or may comprise the rubbers (B-1) and (B-2) in combination. In the combined use of the rubbers (B-1) and (B-2), the proportion of the rubbers (B-1) and (B-2) is not particularly limited, for example, the ethylene/α-olefin copolymer rubbers (B-2) is used in an amount of 50 parts by weight or less, usually from 10 to 50 parts by weight based on the total amount (100 parts by weight) of the ethylene/α-olefin/non-conjugated polyene copolymer rubbers (B-1) and the ethylene/α-olefin copolymer rubbers (B-2). Additionally, the total amount of the ethylene/α-olefin/non-conjugated polyene copolymer rubbers (B-1) and the ethylene/α-olefin copolymer rubbers (B-2) are from 5 to 70 parts by weight, preferably 10 to 65 parts by weight and more preferably 20 to 60 parts by weight based on the total amount (100 parts by weight) of the crystalline ethylene polymer (A2), the ethylene/α-olefin/non-conjugated polyene copolymer rubber (B-1), the polypropylene (C) and the ethylene/α-olefin copolymer rubber (B-2).

Using the copolymer rubbers (B-1) and (B-2) in the above proportion, a thermoplastic elastomer composition having excellent bonding properties with extrusion molded articles, for example, a vulcanized rubber weather strip etc, capable of forming corner parts with proper softness (hardness) and also having excellent moldability can be obtained.

Polypropylene (C)

The polypropylene employed in the invention is the same as that used in the preparation of the second olefin thermoplastic elastomer according to the invention.

The polypropylene (C) is used in an amount of from 5 to 40 parts by weight, preferably 10 to 35 parts by weight and more preferably 15 to 30 parts by weight based on the total amount (100 parts by weight) of the crystalline ethylene polymer (A2) the ethylene/α-olefin (/non-conjugated polyene) copolymer rubber (B) and the polypropylene (C). Using the polypropylene (C) in the above proportion, a thermoplastic elastomer composition having excellent bonding properties with extrusion molded articles, for example, vulcanized rubber weather strip, capable of forming corner parts with proper softness (hardness) and also having excellent moldability can be obtained.

(Cross-Linking Agent (D))

The cross-linking agent (D) employed in the invention is the same as used in the preparation of the second olefin thermoplastic elastomer of the invention. Examples thereof are an organic peroxide, sulfur, a sulfur compound and phenolic vulcanizing agents such as a phenolic resin. Among them, the organic peroxide is preferably used.

The organic peroxide is used in an amount of from 0.01 to 0.12 parts by weight, preferably about 0.03 to 0.10 parts by weight based on the total amount (100 parts by weight) of the crystalline ethylene polymer (A2), the ethylene/α-olefin (/non-conjugated polyene) copolymer rubber (B) and polypropylene (C). Using the organic peroxide in the above proportion, a thermoplastic elastomer composition wherein the crystalline ethylene polymer (A2) and the copolymer rubber (B) are cross-linked is obtained and also molded articles having sufficient rubber characteristics such as heat resistance, tensile properties, elastic recovery and impact resilience, and sufficient strength are obtained. Further, the composition has excellent moldability.

In the cross-linking with the organic peroxide according to the present invention, a cross-linking assistant or a polyfunctional vinyl monomer can be mixed. The use of these compounds can induce uniform and moderate cross-linking reaction. Particularly, it is most suitable to use divinyl benzene because divinyl benzene has easy handling properties, good compatibility with the crystalline ethylene polymer (A2), the copolymer rubber (B) and the polypropylene (C), which are main components of the above compositions for treatment, and has a function of dissolving organic peroxides, and acts as a dispersing assistant for the organic peroxide so that the cross-linking effect with heat treatment is uniform and the composition having a good balance between fluidity and physical properties is obtained.

The cross-linking assistant or the polyfunctional vinyl monomer is used in an amount of usually from 0.01 to 0.4% by weight, preferably about 0.03 to 0.2% by weight based on the total amount (100% by weight) of the crystalline ethylene polymer (A2), the ethylene/α-olefin (/non-conjugated polyene) copolymer rubber (B) and the polypropylene (C). Using the cross-linking assistant or the polyfunctional vinyl monomer in the above proportion, a composition having excellent fluidity which does not induce a change in physical properties caused by heat history during the processing and molding of the composition is obtained.

Other Components

The third olefin thermoplastic elastomer of the invention may be optionally blended with additives such as a slip agent, a filler, an antioxidant, a weathering stabilizer, a colorant as long as the object of the invention is not missed.

Examples of the slip agent and the filler may include those as described above.

Third Olefin Thermoplastic Elastomer

The third olefin thermoplastic elastomer of the invention can be prepared by mixing the crystalline ethylene polymer (A2), the ethylene/α-olefin (/non-conjugated polyene) copolymer rubber (B) and the polypropylene (C) in the above-described specific proportion, and dynamically heat treating them in the presence of the cross-linking agent (D) in the specific amount. In this mixing, the above additive, for example, the slip agent and antioxidant may be mixed.

The dynamic heat treatment of the invention is preferably carried out in a non-opened apparatus in an atmosphere of an inert gas such as nitrogen or carbonic acid gas.

The kneading temperature is usually from 150 to 280° C., preferably 170 to 240° C. The kneading time is usually from 1 to 20 min, preferably 3 to 10 min. The shear force for application is from 10 to 100,000 $\sec^{-1}$, preferably 100 to 50,000 $\sec^{-1}$ in terms of shear rate.

As the kneading apparatus, a mixing roll, intensive mixer (for example, Banbury mixer or kneader), uni-axial or biaxial extruders can be used, and particularly a non-open apparatus is preferable.

According to the present invention, a thermoplastic elastomer composition wherein the crystalline ethylene polymer (A2) and the copolymer rubber (B) are cross-linked can be obtained by the above dynamic heat treatment.

In the invention, the gel fraction, as measured in the above method, is not more than 15% by weight, usually from 0.5 to 15% by weight, preferably 1 to 13% by weight and more preferably 2 to 11% by weight.

The third olefin thermoplastic elastomer thus prepared according to the invention has a melt flow rate (MFR; ASTM D 1238, 230° C., under a load of 2.16 Kg) of usually from 0.01 to 1000 g/10 min, preferably 0.05 to 100 g/10 min and more preferably 0.1 to 70 g/10 min. The thermoplastic elastomer having an MFR of the above range has excellent moldability.

The third olefin thermoplastic elastomer of the invention preferably has an islands-sea structure which structure comprises the phases of the crystalline ethylene polymer (A2) and the ethylene/α-olefin (/non-conjugated polyene) copolymer rubber (B) as a particle phase and the phase of the polypropylene (C) as a matrix phase.

The third olefin thermoplastic elastomer thus prepared according to the invention is preferably the first olefin thermoplastic elastomer of the invention.

That is, the third olefin thermoplastic elastomer desirably has a particle phase of an average particle diameter of not more than 2 μm the islands-sea structure, a gel fraction of from 0.5 to 15% by weight, and a quantity of heat of melt at 125° C. or below, as measured in a differential scanning calorimeter (DSC) of not less than 40% based on the all quantity of heat of melt.

With regard to the third olefin thermoplastic elastomer of the invention, the proportion of a particle phase having a ratio of major axis to minor axis of two or more is preferably not more than 3%, more preferably from 0.1 to 3% based on the total number of the particle phases.

The third olefin thermoplastic elastomer of the invention desirably has a compression set (CS) at 70° C. satisfying the following formulas.

$$CS(NH) < 70\%$$

$$CS(NH) - CS(H) \geq 5\%$$

wherein CS (NH) is a CS for a molded article which is not treated with heat after molding, and CS (H) is a CS for a molded article which has been treated with heat at 100° C.

The CS(NH) is preferably not more than 70%, more preferably not more than 65% and further preferably not more than 60%. The lower limit of the CS (NH), which is particularly undefined, is usually not less than 30%. The value of CS(NH)–CS(H) is preferably not less than 5%, more preferably not less than 7% and further preferably not less than 10%. The thermoplastic elastomer having a value of CS(NH)–CS (H) of not less than 5% generally has excellent rubber elasticity.

In the heat treatment of molded articles, the temperature is not particularly limited as long as it is generally 80° C. or higher. It is preferably 90° C. or higher, more preferably 100° C. or higher. The upper limit of the temperature, which is particularly undefined, is generally 130° or below. The temperature described here refers to an ambient temperature.

The time of the heat treatment, which is particularly undefined, usually 1 hr or more, preferably 5 hrs or more and further preferably 10 hrs or more. The upper limit thereof is usually 24 hrs or less.

In the heat treatment, a heater for application of heat or an oven can be used appropriately. The method of measuring the CS will be described in Examples.

The second or third olefin thermoplastic elastomer according to the invention is preferably such a thermoplastic elastomer that when the bonding test of a vulcanized rubber to a press molded article is carried out, base material breaking is induced by a tensile peeling test.

Herein, the tensile peeling test of a weld product of a vulcanized rubber with a press-molded article (sheet) will be described.

(Preparation of Vulcanized Rubber)

As the above vulcanized rubber, a rubber blend is prepared by mixing 100 parts by weight of a starting material rubber, 170 parts by weight of carbon black, 95 parts by weight of a softener, 5 parts by weight of zinc oxide, 1 part by weight of a stearic acid, 1 part by weight of an activator, 50 parts by weight of calcium oxide, 5 parts by weight of sulfur, 15 parts by weight of 2-mercaptobenzothiazole, 5 parts by weight of dibenzothiadyl disulfide, 20 parts by weight of zinc dibutyl dithiocarbamic acid, 5 parts by weight of zinc dimethyl dithiocarbaminic acid, 10 parts by weight of ethyleneurea and 5 parts by weight of dithiodimorpholine.

The thermoplastic elastomer of the invention is welded with a vulcanized rubber and then subjected to the tensile peeling test. In this test, ethylene/propylele/5-ethylidene-2-norbornene random copolymer rubber having an ethylene content of from 65 to 70% by mol, an intrinsic viscosity [I], as measured in decalin at 135°, of from 2.5 to 3.0 dl/g and an iodine value of from 10 to 15 g/100g is used as a starting material rubber of the vulcanized rubber.

(Press-Molding Method)

The above-described rubber blend is molded with vulcanization by heating at 170° C. for 10 min using a 150 ton press to produce a flat plate 12 cm in length, 14.7 cm in width and 2 mm in thickness. Thus, a vulcanized rubber press-sheet is obtained.

(Method of Bonding (Joining) a Press-Molded Article)

Just before joining with a corner portion, the vulcanized rubber-press sheet is cut with a cutter to have 2.5 cm in length. Then the sheet is set in a mold so that the cut surface thereof is joined with a thermoplastic elastomer. Thereafter, the corner portion is melt-bonded at an injection temperature of 230° C. at a mold temperature of 50° C. to obtain a specimen for observation of peeling condition.

(Observation of Peeling Condition)

The joint part of the specimen thus prepared is punched out to prepare a strip 2 cm in width. The tensile peeling test of the strip is carried out at a tensile rate of 200 mm/min, and after the test, the cut surface is observed visually to discriminate base material breakage or interface peeling.

Molded Articles

The molded article of the present invention is a composite molded article prepared by bonding (joining) a molded article made of a vulcanized rubber to any one of the first to third olefin thermoplastic elastomers, preferably bonding them.

Although such a composite molded article can be produced by, for example, previously preparing a molded article made of a vulcanized rubber and a molded article made of a thermoplastic elastomer, melting the interfaces thereof with heating and then contacting them each other, it is preferred to employ a method that a melted thermoplastic elastomer is allowed to contact with a molded article made of a vulcanized rubber previously prepared and then solidified. Further, there is exemplified a method that a molded article made of a vulcanized rubber is set in a mold, and then a molten thermoplastic elastomer is injected and solidified to perform melt bonding. In the invention, insert molding is preferred particularly.

In the invention, in addition to the step of forming the contact part of a molded article of a vulcanized rubber with a molded article of the thermoplastic elastomer of the invention, as described above, it is preferred to carrying out a step of heat treating the molded articles including the contact parts at a temperature of 80° C. or higher.

In the heat treatment of the molded articles, the temperature is not particularly limited as long as it is generally 80° C. or higher. It is preferably 90° C. or higher, more preferably 100° C. or higher. The upper limit of the temperature, which is particularly undefined, is generally 130° or below. The temperature described here refers to an ambient temperature.

The time of the heat treatment, which is particularly undefined, usually 1 hr or more, preferably 5 hrs or more and further preferably 10 hrs or more. The upper limit thereof is usually 24 hrs or less.

In the heat treatment, a heater for application of heat or an oven can be used appropriately.

The above methods can provide composite molded articles having excellent bonding strength.

As the vulcanized rubber forming the molded articles, an ethylene/α-olefin/polyene copolymer rubber is preferred from the standpoint of bonding properties with the thermoplastic elastomer composition. Further, as such a copolymer rubber, it is preferred to use the above-described ethylene/α-olefin(/non-conjugated polyene) copolymer rubber (B).

The vulcanized rubber used herein may include not only vulcanized rubbers cross-linked with sulfur but also those cross-linked with other cross-linking agents.

The first to third olefin thermoplastic elastomers according to the invention are suitably used to a corner portion for bonding to a vulcanized rubber molded article that is used as interior and exterior materials of vehicles, for example, a corner portion (corner material) of an automobile weather strip. Specifically, in molding a corner portion in such a way that a polyolefin vulcanized rubber-extrusion molded article is cut, the resulting cut extrusion molded articles are jointed from the different directions, any one of the first to third olefin thermoplastic elastomer (composition) of the invention is injection molded at a temperature of the melting point thereof or higher, and thereby is contacted with the vulcanized rubber extrusion molded article and welded to prepare a weather strip.

The weather strip having a corner portion of a molded article of any one of the first to third thermoplastic elastomers according to the invention will be described in detail on the basis of FIG. 1.

FIG. 1 shows schematic perspective views illustrating an automobile weather strip (glass run channel) and a process for forming the same.

As shown in FIG. 1(A), an automobile weather strip comprises cut extrusion molded articles 1, 2 made of a vulcanized rubber and a joint corner portion 3 which portion is formed in joining the cut extrusion molded articles 1, 2 from the different directions. The cut extrusion molded articles 1, 2 are prepared by extrusion molding the vulcanized rubber into a channel form and then cut into the prescribed length. The cut extrusion molded articles 1, 2 have a linear (straight) form in a longitudinal direction. The term "joint corner portion (member)" used herein is a thermoplastic elastomer part, which is formed in joining the cut extrusion molded articles each other from the different directions.

The weather strip can be prepared in the following manner.

First, a mold 4 for injection molding is previously heated to the prescribed temperature. Next, as shown in FIG. 1(B), the cut extrusion molded articles 1, 2 of the vulcanized rubber are inserted into the mold 4.

Subsequently, any one of the first to third olefin thermoplastic elastomers according to the invention which has been molten in a heating chamber (inside screw) not shown at a temperature of the melting point thereof or higher is injected to the gap formed between a cavity and a core of the mold 4, and is welded to the end surfaces of the cut extrusion molded articles 1, 2 and thereafter the thermoplastic elastomer is cooled to obtain a weather strip having a corner part 3, as shown in FIG. 1(A).

The vulcanized rubber employed in preparing the cut extrusion molded articles 1, 2 is preferably a vulcanized rubber comprising an ethylene/α-olefin/non-conjugated polyene copolymer rubber as a main component. Examples of an α-olefin having 3 to 20 carbon atoms in the ethylene/α-olefin/non-conjugated polyene copolymer rubber may include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicocene, 9-methyl-decene-1,11-methyl-dodecene-1 and 12-ethyl-tetradecene-1. These α-olefins may be used singly or in combination with two or more.

Of the α-olefins, α-olefins of 3 to 8 carbon atoms, for example, propylene, 1-butene, 4-methylpentene-1,1-hexeneand 1-octene are particularly preferred.

For obtaining a rubber composition capable of preparing vulcanized rubber molded articles having excellent heat aging resistance, strength properties, rubber elasticity, cold resistance and processability, the ethylene/α-olefin/non-conjugated polyene copolymer rubber preferably contains units derived from ethylene (a) and units derived from an α-olefin of 3 to 20 carbon atoms (b) in a molar ratio of (a) to (b) of 50/50 to 90/10. The molar ratio is more preferably 65/35 to 90/10, further preferably 65/35 to 85/15, particularly preferably 65/35 to 80/20.

Examples of the non-conjugated polyene may include:

chain-like non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene;

cyclic non-conjugated dienes such as methyl tetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene and trienes such as 2,3-diisopropylidene-5-norbornene, 2-ethylidene-3-isopropylidene-5-norbornene, 2-propenyl-2,2-norbornadiene and 4-ethylidene-8-methyl-1,7-nanodiene Of these, 5-ethylidene-2-norbornene, 5-vinyl-2-norbornene, cyclopentadiene and 4-ethylidene-8-methyl-1,7-nanodiene are preferred.

These non-conjugated polyenes may be used singly or in combination with two or more.

The ethylene/α-olefin/non-conjugated polyene copolymer rubber has an iodine value of preferably from 1 to 40, more preferably 1 to 30 because a rubber composition having a high cross-linking efficiency can be obtained, a rubber composition capable of preparing a vulcanized rubber molded article having excellent compression set resistance can be obtained with economical advantage.

The ethylene/α-olefin/non-conjugatedpolyene copolymer rubber has an intrinsic viscosity [η], as measured in decalin at 135° C. of preferably from 2.0 to 4.5 dl/g, more preferably 2.2 to 4.0 dl/g from a view of preparing a rubber composition capable of providing a vulcanized molded article having excellent strength properties, compression set resistance and processability. These ethylene/α-olefin/non-conjugated polyene copolymer rubbers may be used singly or in combination with two or more.

For preparing an extrusion molding vulcanized rubber molded article having sufficient mechanical strength, the vulcanized rubber is preferably mixed with carbon black in an amount of from 30 to 300 parts by weight based on 100 parts by weight of the ethylene/α-olefin/non-conjugated polyene copolymer rubber.

Examples of the carbon black may include SRF, GPF, FEF, MAF, HAF, ISAF, SAF, FT and MT. For preparing a rubber composition capable of producing a vulcanized rubber molded article having good mechanical strength and good product surface, the carbon black preferably has a nitrogen-adsorbing specific surface area of from 10 to 100 $m^2/g$.

The vulcanized rubber may be blended with conventionally known compounding agents such as antioxidant, processing aid, foaming agent, foaming assistant, colorant, dispersant and flame retardant in accordance with the use of aimed vulcanized products.

Further, the vulcanized rubber may be blended with an inorganic filler as a reinforcing agent in accordance with the use in an amount of usually at most 100 parts by weight based on 100 parts by weight of the ethylene/α-olefin/non-conjugated polyene copolymer rubber.

Examples of the inorganic filler may include silica, soft calcium carbonate, ground calcium carbonate, talc and clay.

Softeners used for conventional rubbers can be used as the softener for mixing in the vulcanized rubber.

Examples of the softener are:

petroleum softeners such as process oil, lubricating oil, paraffin, fluid paraffin, polyethylene wax, polypropylene wax, petroleum asphalt and Vaseline;

coal tar softeners such as coal tar and coal tar pitch;

aliphatic oil softeners such as castor oil, linseed oil, rape oil, soybean oil and coconut oil; tall oil;

factice;

waxes such as beeswax, carnauba wax and lanolin;

aliphatic acids and aliphatic acid salts such as ricinoleic acid, palmitic acid, stearic acid, barium stearate, calcium stearate and zinc laurate; naphthenic acid;

pine oil, rosin, or derivatives thereof;

synthesized polymer substances such as terpene resin, petroleum resin, coumarone-indene resin and atactic polypropylene;

ester softeners such as dioctyl phthalate, dioctyl adipate and dioctyl sebacate;

microcrystalline wax, liquid polybutadiene, liquid modified polybutadiene, liquid polyisoprene, end-modified polyisoparene, hydrogenated end-modfied polyisoprene, liquid Thiokol, and hydrocarbon synthetic lubricating oil.

Of these, petroleum softener, particularly process oil are preferably used. The amount of these softeners for use is appropriately selected in accordance with the use of vulcanized products.

The vulcanizing agent used for vulcanization of vulcanized rubbers may include sulfur and sulfur compounds.

Examples of sulfur may include powdery sulfur, precipitated sulfur, colloidal sulfur, surface-treated sulfur and insoluble sulfur.

Examples of the sulfur compounds may include sulfur chloride, sulfur dichloride and polymeric polysulfide. Further examples thereof may include sulfur compounds, which liberate active sulfur at a vulcanization temperature to vulcanize, such as morpholine disulfide, alkylphenol disulfide, tetramethylthiuram disulfide, dipentamethylene thiuram tetra-sulfide and selenium dimethyldithiocarbamate. Of these, sulfur is preferred.

The sulfur or the sulfur compound is usually used in an amount of from 0.1 to 10 parts by weight based on 100 parts by weight of the above copolymer rubber.

When the sulfur or the sulfur compound is used as a vulcanizing agent, it is preferred to use a vulcanizing accelerator simultaneously.

Examples of the vulcanizing accelerator may include:

sulfene amide compounds such as N-cyclohexyl-2-benzothiazole sulfene amide (CBS), N-oxydiethylene-2-benzothiazole sulfene amide (OBS), N-t-butyi-2-benzothiazole sulfene amide (BBS) and N,N-diisopropyl-2-benzothiazole sulfene amide;

thiazole compounds such as 2-mercaptobenzothiazole (MBT), 2-(2,4-dinitrophenyl)mercaptobenzothiazole, 2-(4-morphorinothio) benzothiazole, 2-(2,6-diethyl-4-morpholinothio)benzothiazole and dibenzothiadyl disulfide;

guanidine compounds such as diphenyl guanidine (DPG), triphenyl guanidine, diorthonitrile guanidine (DOTG), orthotolyl biguanide and diphenyl guanidine phthalate;

aldehyde amine or aldehyde-ammonia compounds such as acetoaldehyde-aniline condensate, butylaldehyde-aniline condensate, hexamethylene tetramine(H) and acetoaldehyde ammonia;

imidazoline compounds such as 2-mercapto imidazoline, etc;

thiourea compounds such as thiocarbanilide, diethylthiourea (EUR), dibutylthiourea, trimethylthiourea and diorthotolylthiourea;

thiuram compounds such as tetramethylthiuram monosulfide (TMTM), tetramethylthiuram disulfide (TMTD), tetraethylthiuram disulfide, tetrabutylthiuram disulfide, tetrakis(2-ethylhexyl) thiuram disulfide (TOT) and dipentamethylene thiuram tetrasulfide (TRA);

dithiocarbamic acid esters such as zinc dimethyl dithiocarbamate, zinc diethyl dithiocarbamate, zinc di-n-butyldithiocarbamate, zinc ethylphenyl dithiocarbamate, zinc butylphenyldithiocarbamate, sodium dimethyldithiocarbamate, selenium dimethyldithiocarbamate and tellurium dimethyldithiocarbamate;

xanthates such as zinc dibutyl xanthogenic acid etc; and zinc white (zinc oxide).

These vulcanizing accelerators are used in an amount of usually from 0.1 to 20 parts by weight based on 100 parts by weight of the above copolymer rubber.

Examples of the antioxidant used for the vulcanized rubbers are amine, hindered phenol and sulfur antioxidants. These antioxidants are used in an amount of not missing the object of the invention. Examples of the amine antioxidant may include diphenyl amines, phenylene diamines etc. Examples of the sulfur antioxidant may include sulfur antioxidants usually used for rubbers.

As a processing aid, processing aids usually used for processing rubbers can be used. Examples thereof may include higher aliphatic acids such as linoleic acid, ricinoleic acid, stearic acid, palmitic acid and lauric acid; salts of higher aliphatic acids such as barium stearate, zinc stearate and calcium stearate; and esters of the above higher aliphatic acids.

Such a processing aid is used in an amount of usually not more than 10 parts by weight based on 100 parts by weight of the ethylene/α-olefin/non-conjugated polyene copolymer rubber. It is desirable to determine the optimum amount appropriately in accordance with the required physical properties.

Examples of the foaming agent may include:

inorganic foaming agents such as sodium bicarbonate (sodium hydrogen carbonate), sodium carbonate, ammonium bicarbonate, ammonium carbonate and ammonium nitrite;

nitroso compounds such as N,N'-dimethyl-N,N'-dinitroso terephthal amide and N,N'-dinitrosopentamethylene tetramine (DPT);

azo compounds such as azodicarbonamide (ADCA), azo-bisisobutylonitrile (AZBN), azobiscyclohexylnitrile, azodiaminobenzene and barium azodicarboxylate;

sulfonyl hydrazide compounds such as benzene sulfonyl hydrazide (BSH), toluene sulfonyl hydrazide (TSH) and p,p'-oxybis(benzene sulfonyl hydrazide)(OBSH); and azido compounds such as calcium azido, 4,4-diphenyl disulfonyl azido and p-toluenesulfonyl azido.

Further, the vulcanized rubber components may be blended with conventionally known other rubbers and resins prior to use.

Examples of the other rubbers are natural rubber (NR) and isoprene rubbers such as isoprene rubber (IR); and conjugated diene rubbers such as butadiene rubber (BR) styrene-butadiene rubber (SBR), acrylonitrile-butadiene rubber(NBR) and chloroprene rubber (CR).

Examples of the other resins are polyethylene, polypropylene, 1,2-polybutadiene and polybutene.

Rubber Composition and Preparation of Vulcanized Rubber Molded Article

The rubber composition used in the preparation of the vulcanized rubber molded articles can be prepared by kneading an ethylene/α-olefin/non-conjugated polyene copolymer rubber, carbon black, the rubber reinforcing agent, the inorganic filler, the softener and other additives at a temperature of from 80 to 170° C. for 2 to 20 min by means of an internal mixer (closed mixer) such as Banbury mixer, kneader or intermix, and additionally mixing with sulfur and, optionally, the vulcanization accelerator, the vulcanization aid, the foaming agent and the foaming aid by means of a roll such as open roll or kneader, then kneading at a roll temperature of from 40 to 80° C. for 5 to 30 min, and then sheeting.

The rubber composition for extrusion molding thus prepared is formed into an aimed form by means of an extrusion molding machine, and then at the same time as the molding or after introducing the molded article into a vulcanizer, then vulcanizing with heating at a temperature of from 140 to 300° C. for 1 to 20 min.

The vulcanization step is usually carried out continuously. The heating in the vulcanizer can be carried out by heating means such as hot air, glass bead fluid bed, molten salt bath (LCM: liquidcuringmedium), PCM (Powder Curing-Medium or Powder Curing Method), UHF (Ultra short wave electromagnetic wave) or steam.

In the above, the olefin thermoplastic elastomer of the invention is described with reference to weather strips. The first to third olefin thermoplastic elastomers according to the invention are applicable to not only form a melt molded article in a vulcanized rubber molded article but also form a surface part of door trim by a melt surface layer.

EFFECT OF THE INVENTION

According to the invention, the thermoplastic elastomer composition having sufficient bonding strength to vulcanized rubbers (a base material) by no way of an adhesive layer and capable of forming molded articles having the characteristic that at peeling the base material is broken, that is, any of molded articles are broken but the molded articles are not broken at the interface thereof, and the molded articles obtainable by melt bonding the composition with a vulcanized rubber are provided. Further, the olefin thermoplastic elastomer composition capable of forming molded articles having sufficient hardness and rubber elasticity, and having excellent moldability and economic properties, the process for production thereof and the molded articles obtainable by melt bonding the elastomer with a vulcanized rubber can be obtained.

EXAMPLES

The present invention will be illustrated by the following Examples without limiting any scope of the invention.

Melting points (Tm) of the high density polyethylenes and polypropylenes used in Examples 1 to 8 and Comparative Examples 1 to 3, heats of melt and melt flow rates (MFR) of the thermoplastic elastomer (TPE) compositions obtained in Examples 1 to 8 and Comparative Examples 1 to 3, and tensile peel strengths, destruction patterns in the peeling, hardness, tensile strengths, elongations, compression sets (CS) and moldability of the molded products comprising the thermoplastic elastomer compositions obtained in Examples 1 to 8 and Comparative Examples 1 to 3, were measured or evaluated by the following manners. The islands-sea structure was observed by the later-described method.

(1) Melting Points (Tm) of High Density Polyethylene and Polypropylene, and Heat of Melt of TPE Composition Pellets were annealed at 230° C. for 10 minutes, cooled to 30° C. at a rate of 10° C./min with the use of a differential scanning calorimeter (DSC), maintained at the temperature for 1 minute and heated at a rate of 10° C./min. The temperature at which the heat of absorption was maximum was taken for the melting point (Tm). The heat of melt (total heat of melt) was determined from the area found between the measured curve and the base line.

(2) Heat of Melt of TPE Composition at 125° C. or Below

The heat of melt at 125° C. or below was determined from a heat-of-melt measurement temperature curve constructed of the temperature data obtained in (1).

(3) Melt Flow Rate (MFR)

The melt flow rate of the thermoplastic elastomer composition was determined in accordance with ASTM D 1238-65T at 230° C. and under a load of 2.16 kg.

(4) Tensile Peel Strength and Destruction Pattern in Peeling

The pressed sheet of vulcanized rubber (a plate of 12 cm long×14.7 cm wide×2 mm thick) obtained in later-mentioned Reference Example was cut into a size of 2.5 cm long×14.7 cm wide×2 mm thick with a cutter to form an adherend. The resulting adherend (to use at peeling test) of vulcanized rubber molded product was attached to an injection-molding mold by means of a pressure sensitive adhesive double coated tape.

The bonding thermoplastic elastomer composition was injection molded by a 100-ton injection molding machine so that the composition was injected onto a cross section of the vulcanized rubber molded product to effect there hot melt bonding.

A 2 cm-wide strip was punched out from the resulting hot-melt-bonded molded product and was subjected to a peel test by a tensile rate of 200 mm/min to measure the tensile peel strength (peel strength of the bonding). At the same time, the resulting peel state after the peel test was visually evaluated.

(5) Hardness

As the hardness, shore hardness-A was measured in accordance with JIS K6301.

(Measuring Conditions)

With the use of a Shore hardness-A measuring apparatus, the hardness was determined by reading a scale immediately after the needle touched a sheet produced with a pressing machine.

(6) Tensile Strength and Elongation

A tensile test was carried out in accordance with JIS K6301 under the following conditions to determine the tensile strength and the elongation at break.

(Testing Conditions)

A test piece of JIS type No. 3 was punched out from a sheet produced with a pressing machine, and the measurement was carried out under the condition of a tensile rate of 200 mm/min.

(7) Compression Set

The compression set (CS) was determined in accordance with JIS K6301 under the following conditions.

(Measuring Conditions)

A cylindrical molded product having a diameter of 29.0 mm and a thickness of 12.7 mm was prepared with a vertical injection molding machine. The molded product was compressed by 25% in the direction of thickness, spacing with spacers, under the temperature condition of 70° C. The compression was released after the lapse of 22 hours and the thickness was measured to determine the compression set.

(8) Observation of Islands-Sea Structure

Pellets of olefin thermoplastic elastomer were stained on their surfaces by ruthenium, frozen and cut into extremely thin slices. After carbon was deposited thereon, the slice was observed with a transmission electron microscope (TEM) (JEM-2000FX produced by JOEL).

REFERENCE EXAMPLE (Preparation of Pressed Vulcanized-Rubber Sheet)

With a 1. 7-L Banbury mixer (BB-2 mixer produced by KOBE STEEL, LTD.) kneaded were 100 parts by weight of an ethylene/propylene/5-ethylidene-2-norbornene copolymer rubber as a raw rubber (ethylene content =68% by mol, intrinsic viscosity [η] measured at 135° C. in decalin =2.8 dl/g, iodine value =12), 170 parts by weight of FEF-grade carbon black (Asahi#60G™ produced by ASAHI CARBON), 95 parts by weight of a softener (Diana Process Oil™ PS-430 produced by IDEMITSU KOSAN CO., LTD.), 1 part by weight of stearic acid, 5 parts by weight of zinc white No. 1 and 1 part by weight of an activator (Arquad 2HT-F produced by LION CORPORATION).

The kneading procedure was such that the raw rubber was masticated for 1 minute and mixed with the carbon black, softener, stearic acid, zinc white No. 1 and activator, followed by additional kneading for 2 minutes. Then cleaning was effected by ascending the ram and the kneading was carried out for another 2 minutes, thereby obtaining 1390 parts by weight of a rubber composition (I). The above kneading was carried out with a filling factor of 75%. Two batches were further kneaded in the same manner as above. As a result, 4170 parts by weight of the composition in total was obtained.

Portion, 3670 parts by weight, of the rubber composition (I) was weight out and wrapped around a 14-inch open roll mill (produced by NIHON ROLL K.K.) (front roll surface temperature 60° C., rear roll surface temperature: 60° C., front roll revolutions: 16 rpm, rear roll revolutions: 18 rpm). To the rubber composition (I) added were 5 parts by weight of sulfur, 15 parts by weight of 2-mercaptobenzothiazol (Sanceler M™ produced by SANSHIN CHEMICAL INDUSTRIES. CO., LTD), 5 parts by weight of dibenzothiazyl disulfide (Sanceler DM™ produced by SANSHIN CHEMICAL INDUSTRIES. CO., LTD), 20 parts by weight of zinc dibutyldithiocarbamate (Sanceler BZ™ produced by SANSHIN CHEMICAL INDUSTRIES. CO., LTD), 5 parts by weight of zinc dimethyldithiocarbamate (Sanceler PZ™ produced by SANSHIN CHEMICAL INDUSTRIES. CO., LTD), 10 parts by weight of ethylenethiourea (Sanceler 22C™ produced by SANSHIN CHEMICAL INDUSTRIES. CO., LTD), 5 parts by weight of dithiodimorpholine (Sanfel RTM produced by SANSHIN CHEMICAL INDUSTRIES. CO., LTD) and 50 parts by weight of calcium oxide (Vesta pp™ produced by INOUE SEKKAI KOGYO K.K.). The mixture was kneaded with a 14-inch open roll mill (produced by NIHON ROLL K.K., roll temperature: 60° C.) for 7 minutes, thereby obtaining a rubber composition (II).

A pressed vulcanized-rubber sheet was prepared from this rubber composition (II) by the procedure described above, with the use of a 150-ton press.

EXAMPLE 1

By means of a Henschel mixer sufficiently mixed together were 15 parts by weight of a high density polyethylene [density (ASTM D 1505): 0.956 g/cm$^3$, MFR (ASTM D 1238, 190° C., 2.16 kg load): 6 g/10 min, melting point (Tm): 127° C., abbreviated as HDPE-1 hereinafter], 47 parts by weight of an oil-extended ethylene/propylene/5-ethylidene-2-norbornene copolymer rubber as a rubber component [ethylene content: 78 mol %, propylene content: 22 mol %, iodine value: 13, Mooney viscosity [ML$_{1+4}$(100° C.)]: 74, oil extension amount: 40 parts by weight of a paraffinic process oil (PW-380™ produced by IDEMITSU KOSAN CO., LTD.) per 100 parts by weight of the rubber, abbreviated as EPT hereinafter], 38 parts by weight of a propylene/ethylene/1-butene terpolymer as a polypropylene [MFR (ASTM D 1238, 230° C., 2.16 kg load): 7.0 g/10 min, melting point (Tm): 136° C., abbreviated as PP-1 hereinafter], 0.1 part by weight of a phenolic antioxidant (Irganox 1010™ produced by Ciba-Geigy Japan) as an antioxidant, 0.1 part by weight of a diazo weathering stabilizer (TINUVIN 326 produced by Ciba-Geigy Japan) as a weathering stabilizer, 0.3 part by weight of slip agent (armoslip CP produced by LION Co., LTD)

0.08 part by weight of an organic peroxide (Perhexa 25B™ produced by NOF CORPORATION) as a crosslinking agent, and 0.04 part by weight of divinylbenzene (DVB) as a crosslinking assistant.

The mixture was granulated with an extruder (TEM-50T produced by TOSHIBA MACHINE Co., Ltd., L/D=40, cylinder temperature: C1–C2=120° C., C3–C4=140° C., C5–C6=180° C., C7–C8 =200° C., C9–C12=220° C., dice temperature: 210° C., screw revolutions: 200 rpm, throughput: 40 kg/h) while pouring therein 20 parts by weight of a paraffinic process oil (PW-380TM produced by IDEMITSU KOSAN CO., LTD.), thereby obtaining pellets of thermoplastic elastomer composition.

The thermoplastic elastomer composition obtained was observed with the transmission electron microscope (TEM) to show that the EPT phase and the HDPE-1 phase were both particles (islands) and the PP-1 phase was the matrix (sea). The average particle diameter of the particle phases was not more than 2 μm. The particle phases having a ratio of the longest diameter to the shortest diameter of at least 2 accounted for 0.5% in number of the total particle phases. The composition had a gel fraction of 7% by weight and a heat of melt (total heat of melt) of 45 J/g, in which the heat of melt at 125° C. or below occupied 58% of the total heat of melt.

The thermoplastic elastomer composition in the form of pellets was injection molded, and the resulting molded product was evaluated by the above manners.

The thermoplastic elastomer composition was injection molded by a 100-ton injection molding machine so that the composition was injected onto a cross section of the pressed vulcanized-rubber sheet to effect there hot melt bonding. The resulting molded product was subjected to the following tensile peel test.

(Tensile Peel Test for Molded Product)

A molded product, such as a weatherstrip, composed of a molded product comprising a vulcanized rubber, such as that described in the section on the vulcanized rubber, and a molded product comprising the thermoplastic elastomer composition, bonded to each other to form a joint, was subjected to a tensile test by stretching at a tensile rate of 200 mm/min with the joint interposed between two prehension points. The cross section of the tested molded product was observed to confirm whether the molded product had been destroyed at the joint (interface rupture) or elsewhere in the body (body rupture).

The results are shown in Table 1.

EXAMPLE 2

Pellets of thermoplastic elastomer composition were obtained in the same manner as in Example 1, except that the HDPE-1 was replaced by a high density polyethylene (hereinafter abbreviated as HDPE-2) having a density (ASTM D 1505) of 0.954 g/cm$^3$, an MFR (ASTM D 1238, 190° C., 2.16 kg load) of 0.8 g/10 min and a melting point (Tm) of 131° C.

The thermoplastic elastomer composition obtained had an islands-sea structure, in which the average particle diameter of the particle (islands) phases was not more than 2 μm and the particle phases having a ratio of the longest diameter to the shortest diameter of at least 2 accounted for 1.3% in number of the total particle phases. The composition had a gel fraction of 8% by weight and a heat of melt of 45 J/g, in which the heat of melt at 125° C. or below occupied 57% of the total heat of melt.

The thermoplastic elastomer composition in the form of pellets was injection molded, and the resulting molded product was evaluated by the above manners.

The results are shown in Table 1.

EXAMPLE 3

Pellets of thermoplastic elastomer composition were obtained in the same manner as in Example 1, except that the HDPE-l was replaced by a high density polyethylene (hereinafter abbreviated as HDPE-3) having a density (ASTM D 1505) of 0.965 g/cm$^3$, an MFR (ASTM D 1238, 190° C., 2.16 kg load) of 13 g/10 min and a melting point (Tm) of 131° C.

The thermoplastic elastomer composition obtained had an islands-sea structure, in which the average particle diameter of the particle (islands) phases was not more than 2 μm and the particle phases having a ratio of the longest diameter to the shortest diameter of at least 2 accounted for 0.3% in number of the total particle phases. The composition had a gel fraction of 7% by weight and a heat of melt of 45 J/g, in which the heat of melt at 125° C. or below occupied 58% of the total heat of melt.

The thermoplastic elastomer composition in the form of pellets was injection molded, and the resulting molded product was evaluated by the above manners.

The results are shown in Table 1.

EXAMPLE 4

Pellets of thermoplastic elastomer composition were obtained in the same manner as in Example 1, except that the PP-1 was replaced by a propylene/ethylene copolymer [MFR (ASTM D 1238, 230° C., 2.16 kg load): 21 g/10 min, melting point (Tm) 145° C., hereinafter abbreviated as PP-2].

The thermoplastic elastomer composition obtained had an islands-sea structure, in which the average particle diameter of the particle (islands) phases was not more than 2 μm and the particle phases having a ratio of the longest diameter to the shortest diameter of at least 2 accounted for 0.6% in number of the total particle phases. The composition had a gel fraction of 9% by weight and a heat of melt of 48 J/g, in which the heat of melt at 125° C. or below occupied 61% of the total heat of melt.

The thermoplastic elastomer composition in the form of pellets was injection molded, and the resulting molded product was evaluated by the above manners.

The results are shown in Table 1.

EXAMPLE 5

Pellets of thermoplastic elastomer composition were obtained in the same manner as in Example 1, except that the 47 parts by weight of the EPT was replaced by 32 parts by weight of the EPT and 15 parts by weight of an ethylene/propylene copolymer rubber [MFR (ASTM D 1238, 190° C., 2.16 kg load): 0.7 g/10 min, ethylene content: 81 mol %, hereinafter abbreviated as EPR-1].

The thermoplastic elastomer composition obtained had an islands-sea structure, in which the average particle diameter of the particle (islands) phases was not more than 2 μm and the particle phases having a ratio of the longest diameter to the shortest diameter of at least 2 accounted for 0.4% in number of the total particle phases. The composition had a gel fraction of 7% by weight and a heat of melt of 46 J/g, in which the heat of melt at 125° C. or below occupied 59% of the total heat of melt.

The thermoplastic elastomer composition in the form of pellets was injection molded, and the resulting molded product was evaluated by the above manners.

The results are shown in Table 1.

EXAMPLE 6

Pellets of thermoplastic elastomer composition were obtained in the same manner as in Example 1, except that the EPT and the PP-1 were used in amounts of 52 parts by weight and 33 parts by weight, respectively.

The thermoplastic elastomer composition obtained had an islands-sea structure, in which the average particle diameter of the particle (islands) phases was not more than 2 μm and the particle phases having a ratio of the longest diameter to the shortest diameter of at least 2 accounted for 1.5% in number of the total particle phases. The composition had a gel fraction of 10% by weight and a heat of melt of 42 J/g, in which the heat of melt at 125° C. or below occupied 63% of the total heat of melt.

The thermoplastic elastomer composition in the form of pellets was injection molded, and the resulting molded product was evaluated by the above manners.

The results are shown in Table 1.

EXAMPLE 7

Pellets of thermoplastic elastomer composition were obtained in the same manner as in Example 1, except that the EPT and the PP-1 were used in respective amounts of 27 parts by weight and 33 parts by weight and that 25 parts by weight of an ethylene/1-octene copolymer rubber [MFR (ASTM D 1238, 190° C., 2.16 kg load): 1 g/10 min, ethylene content: 87 mol %, hereinafter abbreviated as EOR] was used.

The thermoplastic elastomer composition obtained had an islands-sea structure, in which the average particle diameter of the particle (islands) phases was not more than 2 um and the particle phases having a ratio of the longest diameter to the shortest diameter of at least 2 accounted for 1.3% in number of the total particle phases. The composition had a gel fraction of 9% by weight and a heat of melt of 42 J/g, in which the heat of melt at 125° C. or below occupied 65% of the total heat of melt according to the DSC measurement.

The thermoplastic elastomer composition in the form of pellets was injection molded, and the resulting molded product was evaluated by the above manners.

The results are shown in Table 1.

EXAMPLE 8

Pellets of thermoplastic elastomer composition were obtained in the same manner as in Example 1, except that the EPT, the HDPE-1 and the PP-1 were used in amounts of 52 parts by weight, 20 parts by weight and 28 parts by weight, respectively.

The thermoplastic elastomer composition obtained had an islands-sea structure, in which the average particle diameter of the particle (islands) phases was not more than 2 μm and the particle phases having a ratio of the longest diameter to the shortest diameter of at least 2 accounted for 1.7% in number of the total particle phases. The composition had a gel fraction of 10% by weight and a heat of melt of 50 J/g, in which the heat of melt at 125° C. or below occupied 71% of the total heat of melt.

The thermoplastic elastomer composition in the form of pellets was injection molded, and the resulting molded product was evaluated by the above manners.

The results are shown in Table 1.

EXAMPLE 9

The rubber composition (II) prepared in Reference Example was rolled out in a ribbon shape.

The ribboned rubber composition (II) was extrusion molded by means of an extruder with an extruder head temperature of 80° C. that had a heteromorphy nozzle which has a cross section as shown in the FIG. 1 of 2 mm long×25 mm wide at a rate of 2.5 m/min. The extrusion molded product was vulcanized with a molding line comprising a microwave vulcanizing tank (UHF) and a hot-air vulcanizing tank (HAV) connected in series, thereby obtaining a vulcanized rubber molded product (III).

During the procedure, the UHF temperature was set to 200° C. and the output was controlled so that the surface temperature of the extrusion material became 190° C. at the UHF exit. The HAV vulcanizing tank used was 30 m long, and the temperature inside the tank was set to 250° C. The residence time in the vulcanizing tanks was in total 5 minutes.

The vulcanized-rubber extrusion molded product prepared by a 70-ton vertical injection molding machine was cut at 20 cm intervals, and a piece thereof was set in a mold 4 shown in FIG. 1 so that the thermoplastic elastomer composition could be injected onto a cross section of the molded product to effect there hot melt bonding. Then the thermoplastic elastomer composition obtained in Example 1 was injection molded at an injection temperature of 230° C.

and a mold temperature of 50° C. As a result of the peel test, the body rupture was confirmed.

COMPARATIVE EXAMPLE 1

Pellets of thermoplastic elastomer composition were obtained in the same manner as in Example 1, except that the EPT and the HDPE-1 were used in amounts of 62 parts by weight and 0 part by weight, respectively.

The thermoplastic elastomer composition obtained had an islands-sea structure, in which the average particle diameter of the particle phases was not more than 2 μm and the particle (islands) phases having a ratio of the longest diameter to the shortest diameter of at least 2 accounted for 1.5% in number of the total particle phases. The composition had a gel fraction of 4% by weight and a heat of melt of 18 J/g, in which the heat of melt at 125° C. or below occupied 35% of the total heat of melt.

The thermoplastic elastomer composition in the form of pellets was injection molded, and the resulting molded product was evaluated by the above manners.

The results are shown in Table 1.

COMPARATIVE EXAMPLE 2

Pellets of thermoplastic elastomer composition were obtained in the same manner as in Example 1, except that the crosslinking agent (Perhexa $_{25}$B™) and the crosslinking assistant (divinylbenzene) were used in amounts of 0.16 part by weight and 0.08 part by weight, respectively.

The thermoplastic elastomer composition obtained had an islands-sea structure, in which the average particle diameter of the particle (islands) phases was not more than 2 um and the particle phases having a ratio of the longest diameter to the shortest diameter of at least 2 accounted for 5% in number of the total particle phases. The composition had a gel fraction of 37% by weight and a heat of melt of 43 J/g, in which the heat of melt at 125° C. or below occupied 58% of the total heat of melt.

The thermoplastic elastomer composition in the form of pellets was injection molded, and the resulting molded product was evaluated by the above manners.

The results are shown in Table 1.

COMPARATIVE EXAMPLE 3

Pellets of thermoplastic elastomer composition were obtained in the same manner as in Example 1, except that the crosslinking agent (Perhexa 25B™) and the crosslinking assistant (divinylbenzene) were used in amounts of 0.24 part by weight and 0.12 part by weight, respectively.

The thermoplastic elastomer composition obtained had an islands-sea structure, in which the average particle diameter of the particle (islands) phases was not more than 2 μm and the particle phases having a ratio of the longest diameter to the shortest diameter of at least 2 accounted for 7% in number of the total particle phases. The composition had a gel fraction of 47% by weight and a heat of melt of 42 J/g, in which the heat of melt at 125° C. or below occupied 58% of the total heat of melt.

The thermoplastic elastomer composition in the form of pellets was injection molded, and the resulting molded product was evaluated by the above manners.

The results are shown in Table 1.

COMPARATIVE EXAMPLE 4

The sample prepared in Comparative Example 1 was molded in the same manner as in Example 9, and the resulting molded product was subjected to the tensile peel test. The result was that the molded product had been destroyed by interface rupture, with no body rupture observed.

With respect to the components undescribed in the composition section in Table 1 that were used in Examples 1 to 8 and Comparative Examples 1 to 3, a slip agent was used in an amount of 0.3 parts by weight, the antioxidant and the weathering stabilizer each 0.1 part by weight, and the paraffinic process oil 20 parts by weight. (*) in Table 1: Percentage of the particle phases that have a ratio of the longest diameter to the shortest diameter of at least 2 to the total particle phases.

(2) Heat of Melt of TPE Composition at 125° C. or Below

The heat of melt at 125° C. or below was determined by the same manner as above.

(3) Crystallinity

The crystalline ethylene polymers were measured for the heat of melt by the use of a differential scanning calorimeter (DSC), which had been calibrated based on a standard sample of indium (Tm: 156.60° C., heat of melt: 28.45 J/g), thereby obtaining the heat of melt of each sample. The heat of melt of the perfectly crystalline polyethylene was also measured. The crystallinity was calculated from the peaks of these heats of melt. The heat of melt of the perfectly crystalline polyethylene was 293 J/g.

TABLE 1

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|
| Composition in TPE composition [parts by weight] | | | | | | | | | | | |
| Rubber component | | | | | | | | | | | |
| EPT | 47 | 47 | 47 | 47 | 32 | 52 | 27 | 52 | 62 | 47 | 47 |
| EPR-1 | | | | | 15 | | | | | | |
| EOR | | | | | | | 25 | | | | |
| Resin component | | | | | | | | | | | |
| HDPE-1 | 15 | | | 15 | 15 | 15 | 15 | 20 | | 15 | 15 |
| HDPE-2 | | 15 | | | | | | | | | |
| HDPE-3 | | | 15 | | | | | | | | |
| PP-1 | 38 | 38 | 38 | | 38 | 33 | 33 | 28 | 38 | 38 | 38 |
| PP-2 | | | | 38 | | | | | | | |
| Crosslinking agent | 0.08 | 0.08 | 0.08 | 0.08 | 0.08 | 0.08 | 0.08 | 0.08 | 0.08 | 0.16 | 0.24 |
| Crosslinking assistant | 0.04 | 0.04 | 0.04 | 0.04 | 0.04 | 0.04 | 0.04 | 0.04 | 0.04 | 0.08 | 0.12 |
| TPE composition | | | | | | | | | | | |
| MFR [g/10 min] | 2.7 | 2.5 | 2.9 | 5.5 | 3.1 | 0.9 | 1.5 | 0.5 | 3.8 | 0.79 | 0.34 |
| Gel fraction [% by weight] | 7 | 8 | 7 | 9 | 7 | 10 | 9 | 10 | 4 | 37 | 47 |
| Percentage of specified particle-phase number (*) [%] | 0.5 | 1.3 | 0.3 | 0.6 | 0.4 | 1.5 | 1.3 | 1.7 | 1.5 | 5 | 7 |
| Total heat of melt [J/g] | 45 | 45 | 45 | 48 | 48 | 42 | 42 | 50 | 18 | 43 | 42 |
| Percentage of heat of melt at 125° C. or below to total heat of melt [%] | 58 | 57 | 58 | 61 | 59 | 83 | 85 | 71 | 35 | 58 | 58 |
| Molded product properties | | | | | | | | | | | |
| Peel strength of bonding [MPa] | 5.2 | 5.1 | 5.1 | 5.1 | 5.2 | 4.9 | 5.1 | 4.5 | 4.2 | 5.1 | 5.5 |
| Destruction pattern in peeling | Body rupture | Body rupture | Body rupture | Body rupture | Body rupture | Body rupture | Body rupture | Body rupture | Interface rupture | Interface rupture | Interface rupture |
| Body rupture rare [%] | 100 | 100 | 20 | 100 | 100 | 40 | 40 | 100 | 0 | 0 | 0 |
| Hardness (Shore-A) | 89 | 90 | 88 | 90 | 90 | 84 | 88 | 86 | 84 | 89 | 90 |
| Tensile strength [MPa] | 7.5 | 7.1 | 7.9 | 7.3 | 8.7 | 8.1 | 8.8 | 6.9 | 5.5 | 7.3 | 8.6 |
| Elongation [%] | 600 | 580 | 810 | 540 | 480 | 520 | 570 | 650 | 520 | 450 | 490 |
| Compression set [%] | 54 | 58 | 57 | 53 | 80 | 54 | 59 | 50 | 74 | 52 | 51 |
| AxCS | 4.32 | 4.64 | 4.56 | 4.24 | 4.80 | 4.32 | 4.72 | 4 | 5.92 | 8.32 | 12.2 |

Melting points (Tm) of the crystalline ethylene polymers and polypropylenes used in Examples 10 to 13 and Comparative Examples 5 to 8, heats of melt and melt flow rates (MFR) of the thermoplastic elastomer (TPE) compositions obtained in Examples 10 to 13 and Comparative Examples 5 to 8, and tensile peel strengths, destruction patterns in the peeling, hardness, tensile strengths, elongations, compression sets (CS) and moldability of the molded products comprising the thermoplastic elastomer compositions obtained in Examples 10 to 13 and Comparative Examples 5 to 8, were measured or evaluated by the following manners.

(1) Melting Points (Tm) of Crystalline Ethylene Polymer and Polypropylene, and Heat of Melt of TPE Composition The melting point (Tm) and the heat of melt (total heat of melt) were determined by the same manner as above.

(4) Melt Flow Rate (MFR)

The MFR of the thermoplastic elastomer composition was determined in the same manner as above.

(5) Tensile Peel Strength and Destruction Pattern in Peeling

The pressed sheet of vulcanized rubber (a plate of 12 cm long×14.7 cm wide×2 mm thick) obtained in above-mentioned Reference Example was cut into a size of 2.5 cm long×14.7 cm wide×2 mm thick with a cutter to form an adherend. The resulting adherend of vulcanized rubber molded product was attached to an injection-molding mold by means of a pressure sensitive adhesive double coated tape.

The bonding thermoplastic elastomer composition was injection molded by a 100-ton injection molding machine so that the composition was injected onto a cross section of the vulcanized rubber molded product to effect there hot melt bonding.

The hot-melt-bonded molded product was heat treated in an oven at 60° C. or 100° C., each for 5 hours, and cooled at ordinary temperature for at least 24 hours.

A 2 cm-wide strip was punched out from each of the hot-melt-bonded molded products, one had been heat treated and one had not been heat treated. The strips were subjected to a peel test by a tensile rate of 200 mm/min to measure the tensile peel strength (peel strength of the bonding). At the same time, the resulting peel state after the peel test was visually evaluated.

(6) Hardness

As the hardness, shore hardness-A was measured by the same manner and under the same conditions as above.

(7) Tensile Strength and Elongation

The tensile strength and the elongation at break were measured by the same manner and under the same conditions as above. (8) Compression set [CS(NH), CS(H)]

The compression set (CS) was determined in accordance with JIS K6301 under the following conditions.

A cylindrical molded product having a diameter of 29.0 mm and a thickness of 12.7 mm was prepared with a vertical injection molding machine. The molded product was heat treated in an oven at 60° C. or 100° C., each for 5 hours, and cooled at ordinary temperature for at least 24 hours.

The molded products, one had been heat treated as above and one had not been heat treated, were compressed by 25% in the direction of thickness, spacing with spacers, under the temperature condition of 70° C. The compression was released after the lapse of 22 hours and the thickness was measured for each of the molded products to determine the compression sets [CS(NH) and CS(H)].

EXAMPLE 10

By means of a Henschel mixer sufficiently mixed together were 15 parts by weight of a low density polyethylene [crystallinity: 10% or more, MFR (ASTM D 1238, 190° C., 2.16 kg load): 7 g/10 min, density (ASTM D 1505): 0.920 g/cm$^3$, melting point (Tm): 108° C., abbreviated as LDPE-1 hereinafter], 47 parts by weight of an oil-extended ethylene/propylene/ 5-ethylidene-2-norbornene copolymer rubber as a rubber component [ethylene content: 78 mol %, propylene content: 22 mol %, iodine value: 13, Mooney viscosity [ML$_{1+4}$ (100° C.)]: 74, oil extension amount: 40 parts by weight of a paraffinic process oil (PW-380™ produced by IDEMITSU KOSAN Co., LTD.) per 100 parts by weight of the rubber, abbreviated as EPT hereinafter], 38 parts by weight of a propylene/ethylene/1-butene terpolymer as a polypropylene [MFR (ASTM D 1238, 230° C., 2.16 kg load): 7.0 g/10 min, melting point (Tm): 136° C., abbreviated as PP-1 hereinafter), 0.1 part by weight of a phenolic antioxidant (Irganox 1010™ produced by Ciba-Geigy Japan) as an antioxidant, 0.1 part by weight of a diazo weathering stabilizer (TINUVIN 326 produced by Ciba-Geigy Japan) and 0.05 part by weight of a HALS weathering stabilizer (Sanol LS-770 produced by SANKYO CO., LTD.) as weathering stabilizers, 0.3 part by weight of slip agent (armoslip CP produced by LION CO., LTD)

0.08 part by weight of an organic peroxide (Perhexa 25B™ produced by NOF CORPORATION) as a crosslinking agent, and 0.04 part by weight of divinylbenzene (DVB) as a crosslinking assistant.

The mixture was granulated with an extruder (TEM-50TM produced by TOSHIBA MACHINE Co., Ltd., L/D= 40, cylinder temperature: C1–C2=120° C., C3–C4=140° C., C5–C6=180° C., C7–C8 =200° C., C9–C12=220° C., dice temperature: 210° C., screw revolutions: 200 rpm, throughput: 40 kg/h) while pouring therein 20 parts by weight of a paraffinic process oil (PW-380™ produced by IDEMITSU KOSAN CO., LTD.), thereby obtaining pellets of thermoplastic elastomer composition.

The thermoplastic elastomer composition obtained was observed with the transmission electron microscope (TEM) to show that the EPT phase and the LDPE-1 phase were both particles (islands) and the PP-1 phase was the matrix (sea). The average particle diameter of the particle phases was not more than 2 $\mu$m. The particle phases having a ratio of the longest diameter to the shortest diameter of at least 2 accounted for 1.0% in number of the total particle phases. The composition had a gel fraction of 5% by weight and a heat of melt of 17 J/g, in which the heat of melt at 125° C. or below occupied 48% of the total heat of melt.

The thermoplastic elastomer composition in the form of pellets was injection molded, and the resulting molded product was evaluated by the above manners.

The thermoplastic elastomer composition was injection molded by a 100-ton injection molding machine so that the composition was injected onto a cross section of the pressed vulcanized-rubber sheet to effect there hot melt bonding. The hot-melt-bonded molded product was heat treated in an oven at 60° C. or 100° C., each for 5 hours, and cooled at ordinary temperature for at least 24 hours.

The hot-melt-bonded molded products, one had been heat treated as above and one had not been heat treated, were subjected to the following tensile peel test.

(Tensile Peel Test for Molded Product)

A molded product, such as a weatherstrip, composed of a molded product comprising a vulcanized rubber, such as that described in the section on the vulcanized rubber, and a molded product comprising the thermoplastic elastomer composition, bonded to each other to form a joint, was subjected to a tensile test by stretching at a tensile rate of 200 mm/min with the joint interposed between two prehension points. The cross section of the tested molded product was observed to confirm whether the molded product had been destroyed at the joint (interface rupture) or elsewhere in the body (body rupture).

The results are shown in Table 2.

EXAMPLE 11

Pellets of thermoplastic elastomer composition were obtained in the same manner as in Example 10, except that the LDPE-1 was replaced by a low density polyethylene (a density (ASTM D 1505) of 0.915 g/cm$^3$, an MFR (ASTM D 1238, 190° C., 2.16 kg load) of 70 g/10 min, a melting point (Tm) of 102° C. and crystallinity of 10% or more, hereinafter abbreviated as LDPE-2).

The thermoplastic elastomer composition obtained was observed with the transmission electron microscope (TEM) to show that the EPT phase and the LDPE-2 phase were both particles (islands) and the PP-1 phase was the matrix (sea). The average particle diameter of the particle (islands) phases was not more than 2 $\mu$m. The particle phases having a ratio of the longest diameter to the shortest diameter of at least 2 accounted for 1.1% in number of the total particle phases. The composition had a gel fraction of 6% by weight and a heat of melt of 19 J/g, in which the heat of melt at 125° C. or below occupied 47% of the total heat of melt.

The thermoplastic elastomer composition in the form of pellets was injection molded, and the resulting molded product was evaluated by the above manners.

The results are shown in Table 2.

EXAMPLE 12

Pellets of thermoplastic elastomer composition were obtained in the same manner as in Example 10, except that the LDPE-1 was replaced by a linear low density polyethylene (MFR (ASTM D 1238, 190° C., 2.16 kg load): 8 g/10 min, density (ASTM D 1505): 0.920 g/cm$^3$, melting point (Tm): 120° C., crystallinity: 10% or more, hereinafter abbreviated as LLDPE).

The thermoplastic elastomer composition obtained was observed with the transmission electron microscope (TEM) to show that the EPT phase and the LLDPE phase were both particles (islands) and the PP-1 phase was the matrix (sea). The average particle diameter of the particle (islands) phases was not more than 2 μm. The particle phases having a ratio of the longest diameter to the shortest diameter of at least 2 accounted for 0.8% in number of the total particle phases. The composition had a gel fraction of 6% by weight and a heat of melt of 28 J/g, in which the heat of melt at 125° C. or below occupied 44% of the total heat of melt.

The thermoplastic elastomer composition in the form of pellets was injection molded, and the resulting molded product was evaluated by the above manners.

The results are shown in Table 2.

EXAMPLE 13

Pellets of thermoplastic elastomer composition were obtained in the same manner as in Example 10, except that the LDPE-1 was replaced by a high density polyethylene (MFR (ASTM D 1238, 190° C., 2.16 kg load): 6 g/10 min, density (ASTM D 1505): 0.956 g/cm$^3$, melting point (Tm): 127° C., crystallinity: 10% or more, hereinafter abbreviated as HDPE-1).

The thermoplastic elastomer composition obtained was observed with the transmission electron microscope (TEM) to show that the EPT phase and the HDPE-1 phase were both particles (islands) and the PP-1 phase was the matrix (sea). The average particle diameter of the particle (islands) phases was not more than 2 um. The particle phases having a ratio of the longest diameter to the shortest diameter of at least 2 accounted for 0.5% in number of the total particle phases. The composition had a gel fraction of 7% by weight and a heat of melt of 45 J/g, in which the heat of melt at 125° C. or below occupied 58% of the total heat of melt.

The thermoplastic elastomer composition in the form of pellets was injection molded, and the resulting molded product was evaluated by the above manners.

The results are shown in Table 2.

EXAMPLE 14

The rubber composition (II) prepared in Reference Example was rolled out in a ribbon shape.

The ribboned rubber composition (II) was extrusion molded by means of an extruder with an extruder head temperature of 80° C. that has a heteromorphy nozzle which has cross section as shown in the FIG. 1 of 2 mm long×25 mm wide at a rate of 2.5 m/min. The extrusion molded product was vulcanized with a molding line comprising a microwave vulcanizing tank (UHF) and a hot-air vulcanizing tank (HAV) connected in series, thereby obtaining a vulcanized rubber molded product (III).

During the procedure, the UHF temperature was set to 200° C. and the output was controlled so that the surface temperature of the extrusion material became 190° C. at the UHF exit. The HAV vulcanizing tank used was 30 m long, and the temperature inside the tank was set to 250° C. The residence time in the vulcanizing tanks was in total 5 minutes.

The vulcanized-rubber extrusion molded product prepared by a 70-ton vertical injection molding machine was cut at 20 cm intervals, and a piece thereof was set in a mold 4 shown in FIG. 1 so that the thermoplastic elastomer composition could be injected onto a cross section of the molded product to effect there hot melt bonding. Then the thermoplastic elastomer composition obtained in Example 10 was injection molded at an injection temperature of 230° C. and a mold temperature of 50° C. to effect hot melt bonding. The resulting hot-melt-bonded molded product was heat treated at 100° C. for 5 hours. As a result of the peel test, the body rupture was confirmed.

COMPARATIVE EXAMPLE 5

Pellets of thermoplastic elastomer composition were obtained in the same manner as in Example 13, except that the EPT and the HDPE-1 were used in amounts of 62 parts by weight and 0 part by weight, respectively.

The thermoplastic elastomer composition obtained was observed with the transmission electron microscope (TEM) to show that the EPT phase was particles (islands) and the PP-1 phase was the matrix (sea). The average particle diameter of the particle (islands) phases was not more than 2 um. The particle phases having a ratio of the longest diameter to the shortest diameter of at least 2 accounted for 1.5% in number of the total particle phases. The composition had a gel fraction of 4% by weight and a heat of melt of 18 J/g, in which the heat of melt at 125° C. or below occupied 35% of the total heat of melt.

The thermoplastic elastomer composition in the form of pellets was injection molded, and the resulting molded product was evaluated by the above manners.

The results are shown in Table 2.

COMPARATIVE EXAMPLE 6

Pellets of thermoplastic elastomer composition were obtained in the same manner as in Comparative Example 5, except that the crosslinking agent (Perhexa $_2$5BTM) and the crosslinking assistant (divinylbenzene) were used in amounts of 0.24 part by weight and 0.18 part by weight, respectively.

The thermoplastic elastomer composition obtained was observed with the transmission electron microscope (TEM) to show that the EPT phase was particles (island) and the PP-1 phase was the matrix (sea). The average particle diameter of the particle (islands) phases was not more than 2 μm. The particle phases having a ratio of the longest diameter to the shortest diameter of at least 2 accounted for 9% in number of the total particle phases. The composition had a gel fraction of 43% by weight and a heat of melt of 42 J/g, in which the heat of melt at 125° C. or below occupied 35% of the total heat of melt.

The thermoplastic elastomer composition in the form of pellets was injection molded, and the resulting molded product was evaluated by the above manners.

The results are shown in Table 2.

COMPARATIVE EXAMPLE 7

Pellets of thermoplastic elastomer composition were obtained in the same manner as in Example 10, except that the LDPE-1 was replaced by an ethylene/propylene random copolymer rubber [MFR (ASTM D 1238, 190° C., 2.16 kg load): 0.7 g/10 min, density (ASTM D 1505): 0.869 g/cm$^3$, melting point (Tm): 33° C., crystallinity: 5% or less, hereinafter abbreviated as EPR-2]

The thermoplastic elastomer composition obtained was observed with the transmission electron microscope (TEM) to show that the EPT phase and the EPR-2 phase were both particles (islands) and the PP-1 phase was the matrix (sea). The average particle diameter of the particle (islands) phases was not more than 2 μm. The particle phases having a ratio of the longest diameter to the shortest diameter of at least 2 accounted for 1.3% in number of the total particle phases. The composition had a gel fraction of 3% by weight and a heat of melt of 13 J/g, in which the heat of melt at 125° C. or below occupied 36% of the total heat of melt.

The thermoplastic elastomer composition in the form of pellets was injection molded, and the resulting molded product was evaluated by the above manners.

The results are shown in Table 2.

COMPARATIVE EXAMPLE 8

Pellets of thermoplastic elastomer composition were obtained in the same manner as in Example 10, except that the crosslinking agent (Perhexa 25B™) and the crosslinking assistant (divinylbenzene) were used in amounts of 0.24 part by weight and 0.18 part by weight, respectively.

The thermoplastic elastomer composition obtained was observed with the transmission electron microscope (TEM) to show that the EPT phase and the LDPE-1 phase were both particles (islands) and the PP-1 phase was the matrix (sea). The average particle diameter of the particle (islands) phases was not more than 2 μm. The particle phases having a ratio of the longest diameter to the shortest diameter of at least 2 accounted for 1.1% in number of the total particle phases. The composition had a gel fraction of 37% by weight and a heat of melt of 19 J/g, in which the heat of melt at 125° C. or below occupied 47% of the total heat of melt.

The thermoplastic elastomer composition in the form of pellets was injection molded, and the resulting molded product was evaluated by the above manners.

The results are shown in Table 2.

COMPARATIVE EXAMPLE 9

The sample prepared in Comparative Example 5 was molded in the same manner as in Example 14, and the resulting molded product was subjected to the tensile peel test. The result was that the molded product was destroyed by interface rupture, with no body rupture observed.

With respect to the components undescribed in the composition section in Table 2 that were used in Examples 10 to 13 and Comparative Examples 7 to 10, a slip agent was used in an amount of 0.3 part by weight, the antioxidant and the weathering stabilizer each 0.1 part by weight, and the paraffinic process oil 20 parts by weight.

TABLE 2

|  | Ex. 10 | Ex. 11 | Ex. 12 | Ex. 13 | Comp. Ex. 5 | Comp. Ex. 6 | Comp. Ex. 7 | Comp. Ex. 8 |
|---|---|---|---|---|---|---|---|---|
| Composition in TPE composition [parts by weight] | | | | | | | | |
| Rubber component | | | | | | | | |
| EPT | 47 | 47 | 47 | 47 | 62 | 62 | 47 | 47 |
| EPR-2 | | | | | | | 15 | |
| Resin component | | | | | | | | |
| LDPE-1 | 15 | | | | | | | 15 |
| LDPE-2 | | 15 | | | | | | |
| LLDPE | | | 15 | | | | | |
| HDPE-1 | | | | 15 | | | | |
| PP-1 | 38 | 38 | 38 | 38 | 38 | 38 | 38 | 38 |
| Crosslinking agent | 0.08 | 0.08 | 0.08 | 0.08 | 0.08 | 0.24 | 0.08 | 0.24 |
| Crosslinking assistant | 0.04 | 0.04 | 0.04 | 0.04 | 0.04 | 0.18 | 0.04 | 0.18 |
| TPE composition | | | | | | | | |
| MFR [g/10 min] | 2.3 | 3.0 | 2.1 | 2.7 | 3.8 | 7.0 | 2.6 | 0.6 |
| Gel fraction [% by weight] | 5 | 6 | 6 | 7 | 4 | 43 | 3 | 37 |
| Percentage of specified particle-phase number (*) [%] | 1.0 | 1.1 | 0.8 | 0.5 | 1.5 | 9 | 1.3 | 1.1 |
| Total heat of melt [J/g] | 17 | 19 | 28 | 45 | 18 | 42 | 13 | 19 |
| Percentage of heat of melt at 125° C. or below to total heat of melt [%] | 48 | 47 | 44 | 58 | 35 | 35 | 36 | 47 |
| Molded product properties | | | | | | | | |
| Peel strength of bonding [MPa] | 5.0 | 5.3 | 4.8 | 5.2 | 4.2 | 4.3 | 4.5 | 5.1 |
| Destruction pattern in peeling | Interface rupture | Interface rupture | Interface rupture | Body rupture | Interface rupture | Interface rupture | Body rupture | Interface rupture |
| Hardness (Shore-A) | 87 | 87 | 86 | 89 | 84 | 83 | 82 | 88 |
| Tensile strength [MPa] | 7.1 | 6.5 | 8.3 | 7.5 | 5.5 | 8.1 | 4.7 | 7.6 |
| Elongation [%] | 480 | 480 | 610 | 600 | 520 | 610 | 440 | 450 |
| Compression set (CSNH) [%] | 67 | 68 | 67 | 54 | 74 | 50 | 77 | 55 |
| Molded product heat treated at 60° C. for 5 hrs | | | | | | | | |
| Tensile strength of bonding [MPa] | 5.0 | 5.3 | 5.0 | 5.3 | 4.3 | 4.2 | 4.6 | 5.3 |
| Destruction pattern in | Interface | Interface | Interface | Body | Interface | Interface | Body | Interface |

TABLE 2-continued

|  | Ex. 10 | Ex. 11 | Ex. 12 | Ex. 13 | Comp. Ex. 5 | Comp. Ex. 6 | Comp. Ex. 7 | Comp. Ex. 8 |
|---|---|---|---|---|---|---|---|---|
| peeling | rupture | rupture | rupture | rupture | rupture | rupture | rupture | rupture |
| Compression set [%] | 63 | 63 | 62 | 52 | 74 | 50 | 75 | 53 |
| Molded product heat treated at 100° C. for 5 hrs |  |  |  |  |  |  |  |  |
| Tensile strength of bonding [MPa] | 5.8 | 5.7 | 5.6 | 5.6 | 4.3 | 4.3 | 4.5 | 5.7 |
| Destruction pattern in peeling | Body rupture | Body rupture | Body rupture | Body rupture | Interface rupture | Interface rupture | Body rupture | Interface rupture |
| Compression set (CS(H)) [%] | 57 | 56 | 55 | 45 | 73 | 50 | 75 | 47 |
| CS(NH)-CS(H) [%] | 10 | 12 | 12 | 9 | 1 | 0 | 2 | 8 |

What is claimed is:

1. An olefin thermoplastic elastomer having an islands-sea structure, wherein:

the average particle diameter of the islands phases is not more than 2 μm, the elastomer has a gel fraction ranging from 0.5 to 15% by weight, and the elastomer has a quantity of heat of melt at a temperature of 125° C. or below, as measured in a differential scanning calorimeter (DSC), of 40% or more based on the total quantity of heat of melt.

2. The olefin thermoplastic elastomer as claimed in claim 1, wherein the heat of melt measured with a differential scanning calorimeter (DSC) is at least 30 J/g.

3. A composite molded article comprised of a molded product comprised of a vulcanized rubber and a molded product comprised of the thermoplastic elastomer claimed in claim 1, said molded products being bonded together.

4. An automobile internal or external equipment comprising a molded product comprising a vulcanized rubber and a molded product comprising the thermoplastic elastomer claimed in claim 1, said molded products being bonded to each other.

5. The automobile internal or external equipment as claimed in claim 4 wherein the molded product comprising the thermoplastic elastomer is a weather strip.

6. A molded product which is a weatherstrip constructed by bonding a corner portion to a linear portion, said linear portion comprising a vulcanized-rubber molded product and said corner portion comprising the thermoplastic elastomer claimed in claim 1.

* * * * *